(12) United States Patent
Trenholm et al.

(10) Patent No.: US 10,504,020 B2
(45) Date of Patent: Dec. 10, 2019

(54) SYSTEM AND METHOD FOR APPLYING A DEEP LEARNING NEURAL NETWORK TO DATA OBTAINED FROM ONE OR MORE SENSORS

(71) Applicant: SIGHTLINE INNOVATION INC., Toronto (CA)

(72) Inventors: Wallace Trenholm, Toronto (CA); Maithili Mavinkurve, Markham (CA); Mark Alexiuk, Winnipeg (CA); Jason Cassidy, Hamilton (CA)

(73) Assignee: SIGHTLINE INNOVATION INC., Toronto (CA)

( * ) Notice: Subject to any disclaimer, the term of this patent is extended or adjusted under 35 U.S.C. 154(b) by 0 days.

(21) Appl. No.: 14/736,189

(22) Filed: Jun. 10, 2015

(65) Prior Publication Data
US 2016/0034809 A1  Feb. 4, 2016

Related U.S. Application Data

(60) Provisional application No. 62/010,172, filed on Jun. 10, 2014, provisional application No. 62/072,590, (Continued)

(51) Int. Cl.
*G06N 3/02* (2006.01)
*G06F 8/30* (2018.01)
(Continued)

(52) U.S. Cl.
CPC .............. *G06N 3/02* (2013.01); *G06F 8/30* (2013.01); *G06F 8/35* (2013.01); *G06F 8/36* (2013.01);
(Continued)

(58) Field of Classification Search
CPC ....................................................... G06N 3/063
See application file for complete search history.

(56) References Cited

U.S. PATENT DOCUMENTS

| 8,145,610 B1 | 3/2012 | Randall et al. |
| 8,171,487 B2 | 5/2012 | Buesing et al. |
| (Continued) | | |

FOREIGN PATENT DOCUMENTS

EP  2688311 A2  1/2014

OTHER PUBLICATIONS

International Search Report corresponding to PCT/CA2015/050539 dated Sep. 24, 2015.
(Continued)

*Primary Examiner* — Vincent Gonzales
(74) *Attorney, Agent, or Firm* — Anil Bhole; Marc Lampert; Bhole IP Law

(57) ABSTRACT

An application provisioning system and method. A server provides an application provisioning service. A user of a client provides a schema defining an application. The application interacts with peripherals coupled to the client and receives input from sensors coupled to the peripherals. The sensor data is provided to the server for processing, including by neural networks. The application includes a workflow defining a finite state machine that traverses states at least partially based on the response to sensor data. The server may provide dynamic reallocation of compute resources to resolve demand for classifier training job requests; use of jurisdictional certificates to define data usage and sharing; and data fusion. Applications include manufacturing verification, medical diagnosis and treatment, genomics and viral detection.

16 Claims, 35 Drawing Sheets

Related U.S. Application Data filed on Oct. 30, 2014, provisional application No. 62/081,152, filed on Nov. 18, 2014, provisional application No. 62/157,041, filed on May 5, 2015.

(51) Int. Cl.
| | |
|---|---|
| *H04L 29/06* | (2006.01) |
| *H04L 12/24* | (2006.01) |
| *G06N 3/04* | (2006.01) |
| *G06F 8/35* | (2018.01) |
| *G06F 8/36* | (2018.01) |
| *G06F 9/50* | (2006.01) |
| *G06K 9/00* | (2006.01) |
| *G06K 9/62* | (2006.01) |

(52) U.S. Cl.
CPC ............ *G06F 9/5027* (2013.01); *G06K 9/00* (2013.01); *G06K 9/00536* (2013.01); *G06K 9/6227* (2013.01); *G06K 9/6256* (2013.01); *G06N 3/0454* (2013.01); *H04L 41/5041* (2013.01); *H04L 67/42* (2013.01); *G06F 2209/503* (2013.01); *G06F 2209/509* (2013.01); *G06F 2209/5017* (2013.01); *G06F 2209/541* (2013.01); *G06F 2209/549* (2013.01)

(56) References Cited

U.S. PATENT DOCUMENTS

| | | | |
|---|---|---|---|
| 8,621,069 B1 | 12/2013 | Tompkins | |
| 2004/0049698 A1* | 3/2004 | Ott | G06F 21/554 726/23 |
| 2013/0162680 A1 | 6/2013 | Perry et al. | |
| 2014/0096667 A1* | 4/2014 | Chapman | G10H 1/0058 84/609 |
| 2014/0237595 A1* | 8/2014 | Sridhara | H04L 63/1408 726/23 |
| 2014/0317692 A1* | 10/2014 | Somekawa | H04L 63/0853 726/4 |
| 2015/0254555 A1* | 9/2015 | Williams, Jr. | G06N 3/0454 706/14 |
| 2015/0332258 A1* | 11/2015 | Kurabi | G06Q 20/382 705/71 |

OTHER PUBLICATIONS

Written Opinion corresponding to PCT/CA2015/050539 dated Sep. 24, 2015.

European Search Report corresponding to European Patent Application No. 15806697.7 dated Mar. 9, 2018.

Jonghoon Jin et al: "Tracking with deep neural networks", 2013 47th Annual Conference on Information Sciences and Systems (CISS), IEEE, Mar. 20, 2013 (Mar. 20, 2013), pp. 1-5, XP032497554.

P Korpipaa et al: "Managing context information in mobile devices", Pervasive Computing, Jul. 1, 2003 (Jul. 1, 2003), pp. 42-51, XP055078859.

Shang Chao et al: "Data-driven soft sensor development based on deep learning technique", Journal of Process Control, vol. 24, No. 3, pp. 223-233, XP028635987, ISSN: 0959-1524, DOI: 10.1016/J.JPROCONT.2014.01.012.

Li Deng: "A tutorial survey of architectures, algorithms, and applications for deep learning", Journals APSIPA Transactions on Signal and Information Processing, vol. 3, SIP (2014), vol. 3, e2, Jan. 1, 2014 (Jan. 1, 2014), pp. 1-29, XP055454074. Asia Pacific Signal and Information Processing Association (APSI) [retrieved on Feb. 23, 2018].

* cited by examiner

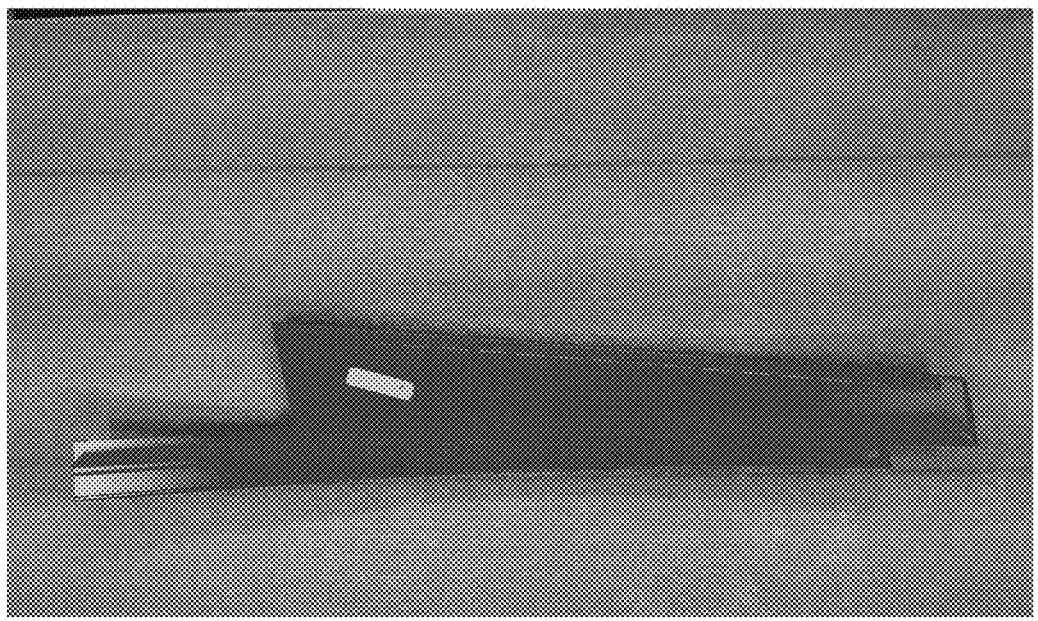
(a)
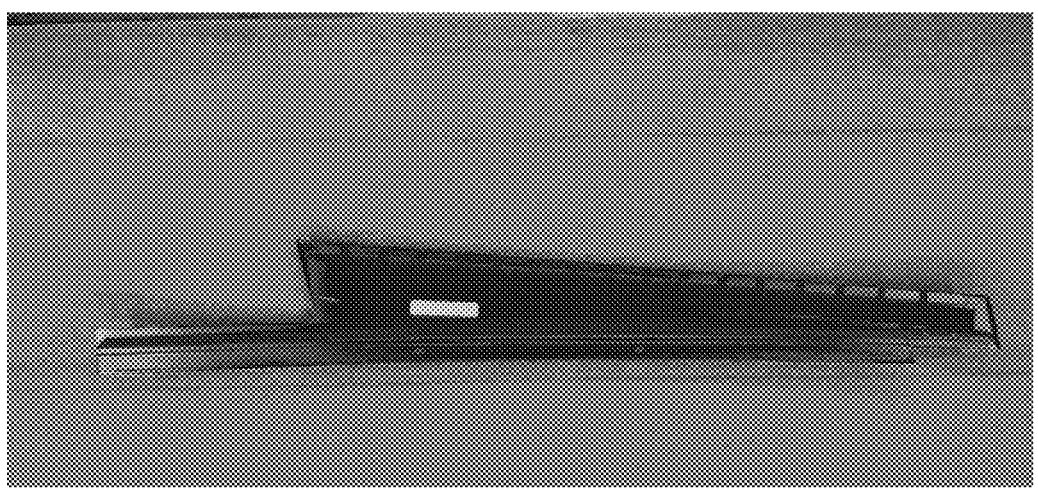
(b)
FIG. 22

Customized Data Processing Algorithm (for Object Classification)

Problem:
Distinguish different objects, using the frames which are not distinguishable by human eye Solution:
Preparing the algorithm:

2602    1. Mask the object from background (Otsu Thresholding)
2604    2. Apply edge detection to the object (Canny Edge Detection)
2606    3. Apply key points detection (Orb)
2608    4. Collect many key points from a number of frames as a template pool For each filtered frame, using the following process 2610    1. Mask the object from background (Otsu Thresholding)
2612    2. Apply edge detection to the object (Canny)
2614    3. Apply key points detection (Orb)
2616    4. Use these key points to match with the key points in the template pool (Hamming Distance), and use the presence of each key points in the template pool as part of the input of machine learning algorithm.
2618    5. Calculate the geometry characteristic (Length) and object surface characteristic (HSV LAB Channel), and use as the input of machine learning algorithm.
2620    6. Apply machine learning algorithm.

FIG. 26

Verify Landing Page
Verify Admin Login Page
FIG. 33

SYSTEM AND METHOD FOR APPLYING A DEEP LEARNING NEURAL NETWORK TO DATA OBTAINED FROM ONE OR MORE SENSORS

TECHNICAL FIELD

The present invention relates generally to server systems, and more particularly to a system and method for server based application development.

BACKGROUND

Network based applications are becoming more prevalent as cloud based systems take hold. Virtualization is currently reshaping how cloud based systems are implemented. It offers new possibilities to vendors that design and supply systems and operators that license, purchase, use and manage them. Based on virtualization, system vendors no longer have to design, manufacture and maintain specific hardware. Instead, they can design their systems to run within standard virtualization systems in standard off the shelf servers and other hardware. These can be privately owned servers running in an operator's data center or the operator can contract with a cloud service provider to rent time on servers. In the cloud case, the operator does not purchase, house or maintain the physical servers. Significant cost savings to the operator can result. Significant cost savings also accrue to the operator if computations can be done close to the sensor/data acquisition. This includes derivation of features and comparison to templates e.g. CAD models or typical samples. Processing at this level also allows a layering of services around the data/feature transport such as encryption, anonymization, jurisdictional policy management.

Cloud service provided servers and others which are used for the provision of virtualization services can be difficult to develop applications for. Complex application programming interfaces and other protocols have to be learned. Moreover, typical cloud-based servers do not have access to specialized hardware such as cameras and robot control systems in a manufacturing setting. Non-optical sensing methods are considered as inputs to the system.

SUMMARY

In one aspect, a cloud based application provisioning system is provided, the system comprising a server system accessible to a client system by a network, the server system: enabling a user of the client system to define an application partially executable on the client system and partially executable on the server system; and providing a plurality of application provisioning services for permitting the application to access a processing module comprising set of GPUs, FPGAs or ASICs for processing intensive computational tasks.

In another aspect, a method for cloud based application provisioning is provided, the method comprising establishing a server system accessible to a client system by a network, the server system: enabling a user of the client system to define an application partially executable on the client system and partially executable on the server system; and providing a plurality of application provisioning services for permitting the application to access a processing module comprising set of GPUs, FPGAs or ASICs for processing intensive computational tasks.

In another aspect, a cloud based application provisioning system is provided, the system comprising a network accessible server system providing a plurality of application provisioning services for defining an application in accordance with a user defined schema transmitted to the server system from a client system, the application being configured to execute partially on the client system and partially on the server system.

In another aspect a method for cloud based application provisioning is provided, the method comprising establishing a network accessible server system providing a plurality of application provisioning services for defining an application in accordance with a user defined schema transmitted to the server system from a client system, the application being configured to execute partially on the client system and partially on the server system.

In another aspect, a system for applying a deep learning neural network to data obtained from one or more sensors on a client system is provided, the system comprising: a client system; a network accessible server system linked to the client system, the server system configured to provision an application executable on the client system and allocating computing tasks to the server system, the application causing interaction with the sensors; one or more peripherals coupled to sensors for transmitting sensor data from the client system to the server system the server system configure to apply a neural network based classification process to the sensor data.

In another aspect, a method of applying a deep learning neural network to data obtained from one or more sensors on a client system is provided, the method comprising: linking the client system to a network accessible server system; configuring the server system to provision an application executable on the client system and allocating computing tasks to the server system, the application causing interaction with the sensors; transmitting sensor data from the client system to the server system; applying a neural network based classification process to the sensor data.

In another aspect, a system for network based application provisioning is provided, the system comprising: a server system for maintaining schema services and classification services, the schema services configured to receive a schema and create a workflow and a session schema based on the schema; a hardware peripheral comprising a sensor to generate sensor data; a client configured to generate a schema comprising configuration information, invoke the schema services to providing a schema to the server system, and invoke the classification services to provide an input to the server system from the hardware peripheral and to generate an output from the classification services to effect a state change based on the workflow.

In another aspect, a method for network based application provisioning is provided, the method comprising: establishing a server system maintaining schema services and classification services, the schema services configured to receive a schema and create a workflow and a session schema based on the schema; coupling a hardware peripheral comprising a sensor to generate sensor data to a client system; configuring the client system to generate a schema comprising configuration information, invoke the schema services to providing a schema to the server system, and invoke the classification services to provide an input to the server system from the hardware peripheral and to generate an output from the classification services to effect a state change based on the workflow.

In another aspect, a system for provisioning an application is provided, the system comprising: an engine providing schema services; a client system accessing the schema services, the client system sending a schema definition comprising metadata to the schema services, the metadata comprising information on peripherals connected at a station of a specialized facility; wherein: the engine generates an application and associated workflow in view of the schema definition; the client system sends inputs from sensors coupled to the peripherals to the engine; outputs are generated from the inputs at least in part at the engine; and a state change of the workflow and application is effected in view of the inputs.

In another aspect, a method of provisioning an application is provided, the method comprising: a client system accessing schema services of an engine the client system sending a schema definition comprising metadata to the schema services, the metadata comprising information on peripherals connected at a station of a specialized facility; the engine generating an application and associated workflow in view of the schema definition; the client system sending inputs from sensors coupled to the peripherals to the engine; generating outputs from the inputs at least in part at the engine; and effecting a state change of the workflow and application in view of the inputs.

These and other aspects are contemplated and described herein. It will be appreciated that the foregoing summary sets out representative aspects of systems, methods, apparatuses for in situ electrochemical imaging to assist skilled readers in understanding the following detailed description.

DESCRIPTION OF THE DRAWINGS

A greater understanding of the embodiments will be had with reference to the Figures, in which:

FIG. 22 shows images having a low white balance and a roughly correct white balance for identifying the presence or absence of foam on a part;

FIG. 26 shows an example data processing technique for object classification;

FIG. 33 shows an example user interface landing page for logging into the engine;

DETAILED DESCRIPTION

Figure 1:
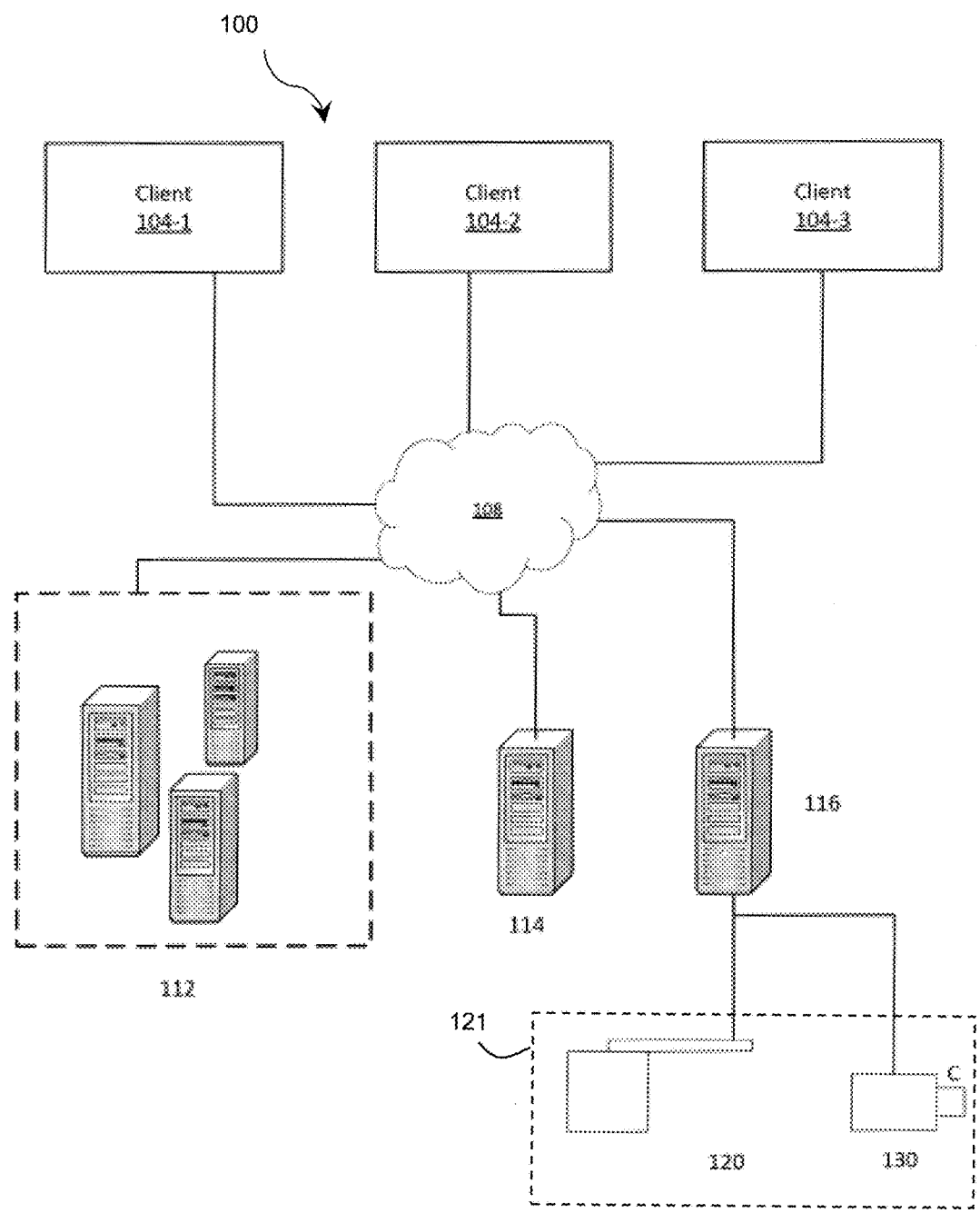
FIG. 1 shows a block diagram of an example implementation of a system for network based application provisioning.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

Referring now to FIG. 1, shown therein is a diagram of a system 100 for network based application provisioning. At least one client (client 104-1, 104-2 and 104-3) is connected, via network 108, to servers 112, and computing devices 114 and 116. Collectively, clients 104-1, 104-2 and 104-3 are referred to as clients 104, and generically as client 104.

Clients 104 can be based on any suitable computing environment, and the type is not particularly limited so long as each client 104 is capable of receiving data from servers 112, displaying data in graphical form and transmitting data to servers 112. In a present embodiment, clients 104 are configured to at least execute an application that can interact with the services hosted by servers 112.

Clients 104 can be based on any type of client computing environment, such as a desktop computer, a laptop computer, a netbook, a tablet, a smart phone, a PDA, other mobile client or any other platform suitable for graphical display that is known in the art. Mobile clients are considered to include wearable devices which contain sensors, cameras, compute resources and network connectivity such as googleGlass, GPS running watches, and health monitoring devices. Each client 104 includes at least one processor connected to a non-transitory computer readable storage medium such as a memory. Memory can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In one embodiment, memory includes both a non-volatile memory for persistent storage computer-readable instructions and other data, and a non-volatile memory for short-term storage of such computer-readable instructions and other data during the execution of the computer-readable instructions. Other types of computer readable storage medium external to client 104 are also contemplated, such as secure digital (SD) cards and variants thereof. Other examples of external computer readable storage media include resistive random access memory (RRAM), compact discs (CD-ROM, CD-RW) and digital video discs (DVD).

Clients 104 can also include one or more input devices connected to at least one processor. Such input devices are configured to receive input and provide data representative of such input to the processor. Input devices can include, for example, gesture recognition, voice, a keypad and a pointing device. A pointing device can be implemented as a computer mouse, track ball, track wheel, touchscreen or any suitable combination thereof. In some examples, clients 104 can include additional input devices in the form of one or more additional buttons, light sensors, microphones and the like. More generally, any suitable combination of the above-mentioned input devices can be incorporated into client 104. Clients 104 can further include one or more output devices. The output devices of clients 104 can include a display. When the pointing device includes a touchscreen, the touchscreen can be integrated with the display. Each client 104 can also include a communications interface connected to the processor. The communications interface allows client 104 to communicate with other clients, for example via network 108. The communications interface is therefore selected for compatibility with network 108.

Network 108 can comprise any network capable of linking servers 112 with clients 104 and can include any suitable combination of wired and/or wireless networks, including but not limited to a Wide Area Network (WAN) such as the Internet, a Local Area Network (LAN), cell phone networks, WiFi networks, WiMax networks and the like. Note that the networks can include persistent or temporary ad hoc networks, and include sensor-compute networks where sensors self-organize based on an optimal configuration to share data, compute features and thereby aggregate information and use a minimal amount of network traffic for long range data transfer. It is assumed that an alternate short range data communication method is also provided for the sensor-compute nodes e.g. BlueTooth. It is conceived that the sensor nodes communicate between themselves to determine spatial distribution of the sensors, line of sight to the nearest transmission station, etc. It is conceived that nodes communicate securely, with encryption, and authenticate a new sensor-node request to join the group and aggregate data.

In general terms, servers 112 can comprise any platform capable of processing, transmitting, receiving, and storing data. In a present embodiment, servers 112 are servers configured to provide network based applications and/or virtualization services. Optionally, servers 112 may be hardware based servers or virtualized servers. Servers 112 can be based on any desired server-type computing environment including appropriate configurations of one or more central processing units (CPUs) configured to control and interact with non-transitory computer readable media in the form of computer memory or a storage device. Computer memory or storage device can include volatile memory such as Random Access Memory (RAM), and non-volatile memory such as hard disk drives or FLASH drives, or a Redundant Array of Inexpensive Disks (RAID) or cloud-based storage.

Servers 112 can also include one or more network interfaces, to connect to network 108 for example. Servers 112 can also be configured to include input devices such as a keyboard or pointing device or output devices such as a monitor or a display or any of or all of them, to permit local interaction. Other types of hardware configurations for servers 112 are contemplated. For example, servers 112 can also be implemented as part of a cloud-based computing solution, whereby the functionality of servers 112 is implemented as one or more virtual machines executing at a single data center or in a mirrored form across a plurality of data centers. The software aspect of the computing environment of servers 112 can also include remote access capabilities in lieu of, or in addition to, any local input devices or local output devices. Any desired or suitable operating system can be used in the computing environment of servers 112. The computing environment can be accordingly configured with appropriate operating systems and applications to effect the functionality discussed herein. Those of skill in the art will now recognize that servers 112 need not necessarily be implemented as stand-alone devices and can be integrated as part of a multi-purpose server or implemented entirely in software, for example as virtual machines (VMs).

Servers 112 may be able to communicate with other computing devices 114 and/or 116 also connected to network 108. Computing devices 114 and/or 116 may be located at specialized facilities 244 (see FIG. 2) such as manufacturing/industrial facilities or a point of care (in medical implementations), and may be operably connected to peripherals 121 such as a camera 120 and a robot arm 130. Specific specialized locations are described below in view of particular embodiments and applications of the systems and methods described herein. Clients 104 may be located at the same specialized locations and may be communicatively linked to the computing devices 114 and/or 116. Alternatively, where a client 104 is located at the specialized location 109, the computing devices 114 and/or 116 may be omitted and the client may be operably connected to peripherals 121.

Network based applications are applications which are in part executed at one or more servers, and partly at one or more clients 104 and/or computing devices 114, 116. More particularly, network based applications are generated in view of schemas provided from the client 104 and/or devices 114, 116 to the servers 112. Server portions of the applications can be hosted by one or more of the servers 112. Client portions of the applications, running on one or more clients and/or computing devices can access server applications as a means of interfacing with the network applications for example. In some implementations, network based applications may be implemented as part of a virtualization platform providing virtualization services for virtualizing server functionality. In some implementations, applications may be generated at the servers 112, but furnished to the client 104 and/or computing devices 114, 116 for execution. It will thus be appreciated that though throughout, the server based applications may be described as being provided to and executed by the client 104, the applications may instead be requested and executed by the computing device 116 at each facility 244 and the client 104 may be located on the same network at the facility 244. Further, any exchange of data may be described as being provided from the client 104 to the servers 112, but in many instances data generated at a specialized facility may be provided to the servers 112 by computing devices 114 and/or 116.

Referring to FIGS. 2 to 6 virtualization services can be provided in the form of an infrastructure as a service (IAAS) platform comprising an engine, such as a cloud engine 202. The IAAS platform and specifically its associated engine may alternately be referred to herein as the "Sightline Perception Engine", "SPE", "Stacknation", or merely "engine".

An IAAS platform can offer services and resources such as a virtual-machine disk image library, raw block storage, file or object storage, firewalls, load balancers, IP addresses, virtual local area networks (VLANs), web servers, scripting services, programming languages and others to allow implementing virtualized server systems and applications. One or more virtual machine monitors (VMMs), also known as hypervisors, such as OpenStack™ cloud software, can facilitate the implementation of virtualized systems and IAAS platforms, as illustrated in the platform 1090 illustrated in FIGS. 4 to 6. VMMs will typically consist of a plurality of projects, each project allowing the control of pools of processing, storage, networking and other resources associated with one or more VMs. Each project may be managed or provisioned through a web-based dashboard, command-line tools or Application Programming Interfaces ("APIs") for example. Accordingly, VMMs can support large numbers of virtual machines and the ability to scale services up and down according to customers' varying requirements.

To deploy virtualized applications, users can install operating-system images and their application software on the IAAS platform. In this model, IAAS providers typically provide IAAS services on a utility computing basis where the costs reflect the amount of resources allocated and consumed. Users, on the other hand maintain the operating systems and the application software on the VMs allocated to them.

To deploy virtualized applications, instead of relying on virtual machines, a container implementation of application development and deployment can be used. According to a container implementation, an 'image' of each application providing an application environment, including libraries required for application execution, may be deployed to clients 104. The use of container implementation may reduce outward dependencies of the applications and ensure reliability, control and stability over software implementation at clients 104 having a range of hardware or software. Optionally, a service such as Docker™ can be used to facilitate container implementation.

Figure 2:
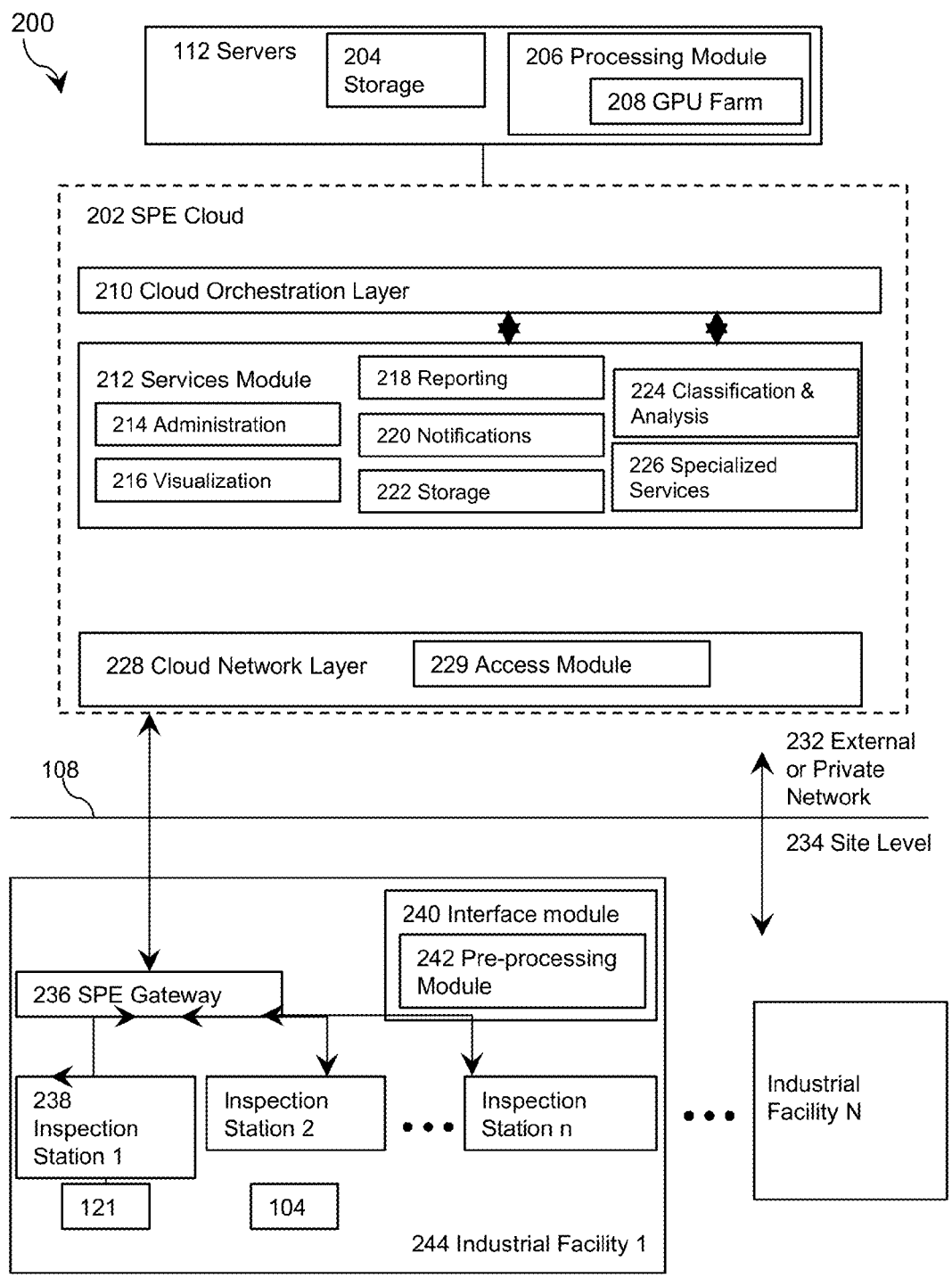
FIG. 2 shows a block diagram of a further example implementation of a system for network based application provisioning.

Referring now to FIG. 2, shown therein is a particular embodiment of a system 200 for network based application provision. The system 200 comprises an engine 202 hosted on servers 112 providing access to services of services module 212, and further comprises a specialized facility 244 in communication with the engine 202. In the illustrated embodiment, for the sake of clarity of illustration the client 104 for requesting services from the engine 202 and executing server based applications is illustrated to be provided at the site level 234, though, as described above, the client may be provided externally to the specialized facility 244 and a computing device 116 at the site may at least partly execute a server based application and communicate with the engine 202.

In use, the client 104 may request services from the engine 202. Information from sensors of peripherals 121 and information input by a user at the client 104 may be sent to the engine for processing in conjunction with providing services of the services module 1002.

As illustrated, the engine 202 may be provided on an external or private network 232 accessed from a network at the site level 234. The engine 202 comprises a services module 212, a cloud network layer 228 and a cloud orchestration layer 210. The cloud network layer 228 comprises an access module 229 and facilitates communication with external computing devices, such as devices at facilities 244 at the site level 234. The cloud network layer may rely on network communication libraries such as ZeroMQ™, CZMQ™ or D-Bus. Data transfer between different facilities may be carried out over a peer to peer network. The peer to peer network may be composed of different groups of peers; a peer group shares data with its peers at the lowest level of data granularity. Data sharing between peer groups occurs at an aggregated level of granularity or not at all; data sharing is asymmetrical. In addition data sharing may be subject to jurisdictional policies for data-sharing or meta-data sharing. The cloud orchestration layer 210 orchestrates the provision and deployment of services or applications. DockerSwarm™ is one orchestration service that may be used. Any orchestration method used will have techniques for job distribution based on methods similar to DockerSwarm™, namely: spread and binpack strategies to compute rank according to a node's available CPU, GPU its RAM, and the number of containers it is running. The services module 212 comprises classification and analysis services 224 for analyzing and/or classifying data provided to the engine; administration services 214; visualization services 216; reporting and archiving services 218 for providing reporting and archiving functions; notification services 220; storage services 222 for storing data provided to the engine and generated at the engine; and specialized services 226 for providing application provisioning in some embodiments as described below.

The engine 202 may be implemented on servers 112 comprising hardware and logic as described above in relation to FIG. 1 to execute functions of the engine 202. The servers 112 may further comprise a processing module 206 for providing the services described above. In embodiments, the processing module 206 comprises a graphics processing unit ("GPU") farm 208 which may utilize the multiple cores of GPUs to perform computationally intensive processing operations. Management of processing module 206 for providing services to various clients 104 will be described herein. The servers 112 further comprise storage 204 for storing data provided by the storage services 222 of the engine.

At the site level 234, the system 200 comprises at least one specialized facility 244, such as an industrial facility, at least one station 238 at each site, a gateway 236, and an interface module 240. The gateway 236 provides access over a network 108 to the engine 202. Each station 238 is linked to a peripheral 121 which may include at least one sensor for generating sensor readings.

The interface module 240 comprises sensor interfaces and system interfaces for transfer of data to the engine 202. Components of the interface module may be provided at each inspection station or for a particular facility 244. Sensor interfaces provide an interface between the peripherals 121 and the client 104. System interfaces provide software interfaces facilitating data transfer to the engine, optionally providing data encryption, data compression, data anonymization, auditing and logging of information, and jurisdictional certificate stamping. Jurisdictional certificates provide information (metadata) about the origin of the data, its legal ownership and the set of data-sharing agreements to which it is subject. This metadata may or may not be contained within any meta-data "header" transferred with the data itself. However, the presence of a jurisdictional certificate enables these further details about the data to be determined by a lookup table (LUT) method from a central administrative server. It is conceived that the jurisdictional certificate is related to public key encryption methods or cyclic redundancy check (CRC) in that, if the jurisdictional certificate is compromised, decryption of the data would be exceedingly difficult. Or that accidental or malicious modification of the jurisdictional certificate could be immediately and simply determined even if the data could not be recovered. Data may be anonymized prior to transfer, for example if multiple facilities have been aggregated into a data sharing agreement where anonymization is required. Logging and audit data may be pushed to the cloud locally, or pulled remotely to the cloud if required, such as to analyze system performance for monitoring the effects of configuration changes. In this context configuration includes sensor configuration settings, network configuration settings, trained classification models, sample templates or computer aided design (CAD) drawings, preprocessing settings/values, classification methods and parameters, etc. Jurisdictional certificate stamping may be provided if a data or meta-data sharing agreement is in place. Meta-data in this case refers to one of: aggregate statistics that describe higher level group characteristics, behaviours, defects or tendencies; population characterizations; differences between expected population characteristics and measured population characteristics; any business or health-related decisions that are based on sample and/or aggregate values where the actual sample level data is never communicated to the external party. Certificates may be signed by trusted third parties and may have a time expiration. The certificate identifies the origin of the data and the policies to which its use is governed. It is conceived that the jurisdictional certificates may be associated with a payment mechanism between data-source and data-sink (end user) for receipt of the data or benefit from the data. It is conceived that these payments are micro-payments. An auditing method may be applied to verify the authenticity of signed certificates for sensors. An encoded jurisdiction identifier may be associated with data and metadata transferred to the engine such that jurisdictional policies can be determined and enforced. Policies may include: right to use the data at various levels of granularity; rights to publish the data; rights to share the data at various levels of granularity within a separate network or association; rights to use the data for various purposes, in various geographic locations or markets, at various times. Jurisdictions may include academic associations, research associations, government/political associations, corporate associations and non-governmental organizations NGOs. The interface module 240 may include a pre-processing module 242 coupled to peripherals 121 for pre-processing of data from any connected sensors. Pre-processing operations may include de-noising and data normalizing. Further, for sensor data processed by compute-intensive and/or iterative data-presentation or training-based methods such as neural networks, alternating optimization (clustering), or self-organizing maps (Kohonen SOM), features may be computed locally in the factory and transferred to the cloud engine in order to train a classifier model. Pre-processing may include feature extraction at the site level (optionally, once data is normalized), carried out with feature extraction techniques by a classification model, such as by a scene parser, as described in more detail below. While the term "scene parsing" implies a labelled segmentation of a visual scene, its use in this document is both literal (for optical sensing data) and metaphorical (for non-optical sensing data). In both cases it conveys the sense of isolating valuable information content, which is determinative in reaching the desired system state or behaviour, from background or noise, which can be and should be ignored in any decision making process. Thus optical and/or non-optical sensing methods are used to collect data and subsequent compute-intensive preprocessing, feature derivation and classification activities are integrated into a decision making and actuator/effector system. Feature extraction includes low and high level techniques: edge detection, thresholding, high/low pass filtering, transforms [e.g. principal component analysis (PCA), independent component analysis ICA, fast fourier transform FFT, wavelet transform], template matching, segmentation, clustering, dimensionality reduction and the like. Feature extraction at the site level may minimize data transfer to the engine. Immediate inspection of computed features at the sensor before transfer may also identify the data as duplicate, irrelevant or otherwise not needing to be transferred. This can happen if the training dataset already has sufficient number of training samples of that type. An example is in anomaly detection where the sensor and its feature-extractor are tuned to be highly sensitive and specific to a signature range of feature values. If the sample does not have feature values in this range or matching predefined attributes, the data is discarded and possibly a counter incremented for monitoring the number of normals in the sampled population. Minimization of data transfer may be conditioned upon a calculation where network traffic and compute costs are weighed against the value that the data is likely to bring to improved classification accuracy and the ultimate business need of the end user. In this instance a cost-matrix is required to determine this decision and would need to be resident in the software-accessible memory of the sensor/factory workstation. The output of the feature extraction can be logged for audit purposes and a signal may be provided to any peripheral that has been integrated with it to effect changes at the peripheral (e.g. moving a robot arm). Features may be encrypted, compressed, logged for auditing, anonymized, and associated with a jurisdictional identifier prior to transfer to and from the engine. Pre-processing can take place on a sensor of peripheral 121 that has been enhanced with compute resources e.g. lab on a chip ("LoC") or system on a chip ("SoC"), or connected to an field-programmable gate array ("FPGA") fabric, application specific integrated circuit ("ASIC"), local servers at the location or cloud servers. Further, it should be noted that individual layers of a deep net can be trained or primed independently of the entire network. This follows from the showing that RBMs can be stacked and trained in a greedy manner to form so-called Deep Belief Networks (DBN). Computations related to these layers can run in parallel as smaller GPU jobs that are allocated independently on available resources.

Classification should be understood in a larger context than simply to denote supervised learning. By classification process we convey: supervised learning, unsupervised learning, semi-supervised learning, active/ground-truther learning, reinforcement learning and anomaly detection. Classification may be multi-valued and probabilistic in that several class labels may be identified as a decision result; each of these responses may be associated with an accuracy confidence level. Such multi-valued outputs may result from the use of ensembles of same or different types of machine learning algorithms trained on different subsets of training data samples. There are various ways to aggregate the class label outputs from an ensemble of classifiers; majority voting is one method.

Management of processing module 206 comprises provision by the engine of a job queue client that dynamically assigns computational resources based on requirements of computing jobs being carried out by hardware resources available to the engine (or at the site level 234) so that compute jobs are performed at a reduced total cost. Metrics exist to quantize job affinity and use the relative speed of each instance type for a particular job, called computing rate(CR). $CR(i, j)$ is the computing rate of instance type i for job j. If $CR(i1, j)$ is twice of $CR(i2, j)$, a task of job j runs twice as fast on i1 than on i2. This and similar metrics allow estimation of job completion, job execution cost and contribute to resolving the resource allocation problem. A cost-function optimized by this re-allocation takes into account: proximity of computation resources (e.g. GPU/FPGA/ASIC resources of the pre-processing module 242) to peripherals in order to minimize data volume transfer; derivation of discriminatory features and feature reduction early on in the processing pipeline in order to reduce data transferred or to process features in a lower cost environment; availability of low cost cloud or server farm compute resources; other factors involved including estimated time for job completion based on a solving-configuration of resources and network. The pre-processing module thus enables rapid computation proximal to the sensor in terms of FPGA fabric, ASIC, GPU, etc. It is assumed that compute resources are in some sense data-agnostic and are available for processing data from a variety of sources and for a variety of purposes (training one of a variety of classifiers, analysis of performance, parameter optimization). Data-agnostic is related to multi-tenanted servers. Each hardware resource is physically located in an environment with operating costs (cooling, electricity, network data transfer charges). Each compute resource has a performance envelope which describes how much of a certain type of work can be executed in a given amount of time. Various resource scheduling algorithms can apply the "backpack problem" to fit the maximum amount of jobs into the performance envelope of the compute resources.

IAAS platforms can be enhanced by facilitating application development for server based applications.

Figure 3:
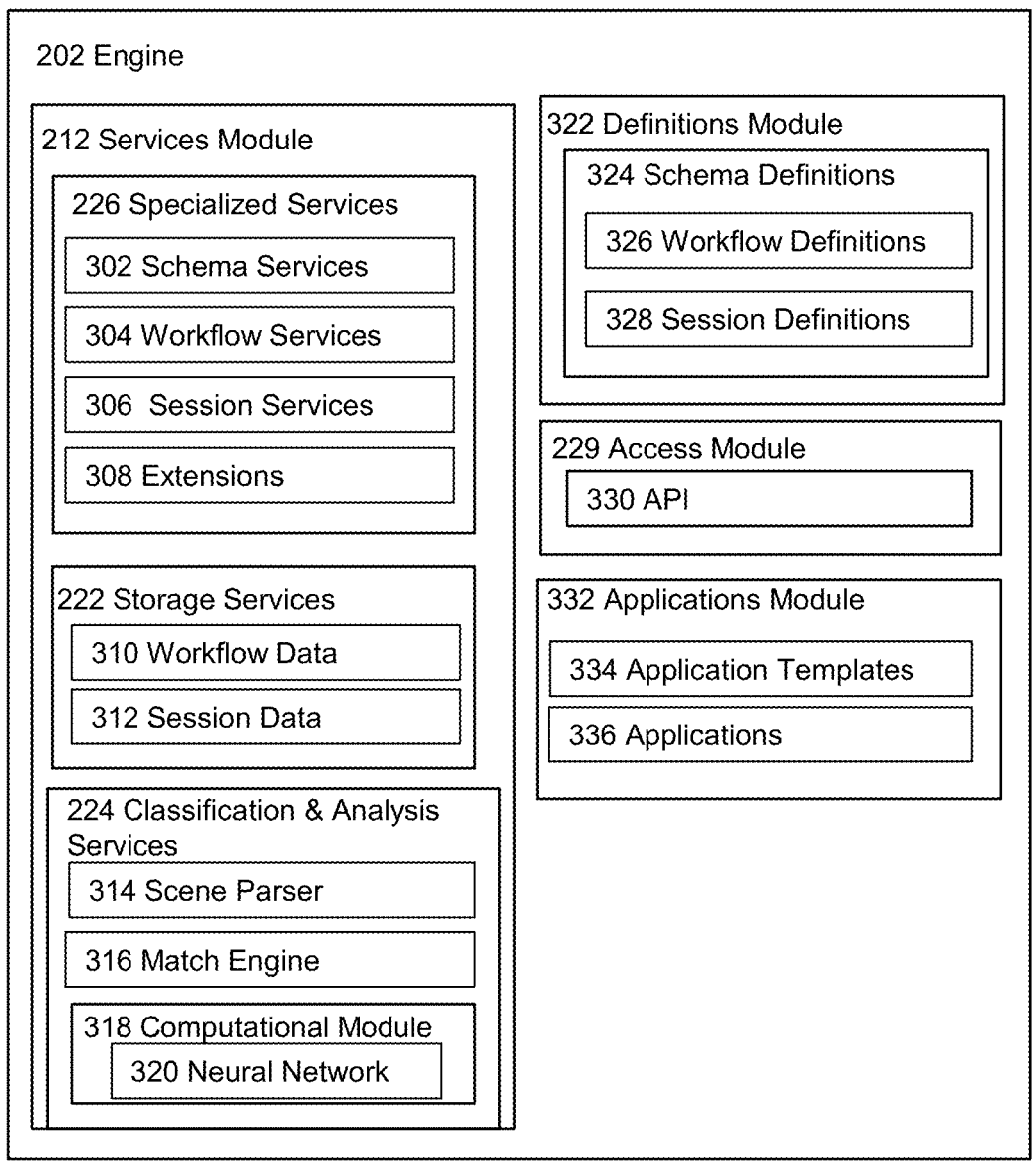
FIG. 3 shows another block diagram of the example implementation of a system for network based application provisioning.

Referring now to FIG. 3, shown therein is a specific embodiment of the engine 202 of an IAAS platform implemented on a server 112 in a system for application provisioning. The components and functionality of the engine 202 will be listed here and described in more detail below. The engine 202 comprises a services module 212, applications module 332, definitions module 322, and access module 229. The services module 212 comprises specialized services 226, storage services 222, and classification and analysis services 224. Broadly, the specialized services 226 provide services for application development such as schema services 302 for creating schema definitions, workflow services 304, session services 306 and extensions 308 to the services. The classification and analysis services 224 classify and/or otherwise analyze data provided to the engine, optionally in conjunction with a scene parser 314 and a match engine 316 and according to computational modules 318, such as a neural network 320. The definitions module 322 comprises schema definitions 324. Schema definitions comprise workflow definitions 326 and session definitions 328 each comprising metadata for defining application templates of applications 336, as well as client sessions (in the case of the session definitions). The applications module 332 comprises applications 336, and application templates 334 formed from schema definitions and workflow definitions. Each application has associated workflow definitions, workflow data, session definitions and session data and has access to particular services. The applications can be accessed through the workflow services or session services from a client. The storage services 222 provide workflow data 310 and session data 312 to server storage 204. The access module 229 provides access to the engine 202. The illustrated access module 229 comprises APIs 330.

In order to facilitate application development, an IAAS can provide several specialized services 226. For example, a schema service 302 can be used to facilitate the development of templates for an application. Schema services can be part of rapid application development services, for example, greatly increasing the speed by which server applications can be developed. Accordingly, an application 336 can be defined in the form of schema definitions which can form the basis of templates 334 for that application. The schema definitions can relate to metadata and can include templates for sessions and for workflows. Templates can be created using known schema languages such as XML.

Several types of schema definitions 324 can be provided to support application development in a definitions module 322. For example, session definitions 328 can be provided that include definitions of metadata corresponding to application sessions. Typically, session metadata can be tied to a user of client 104. For example, a session can be a creation and access session of the application, and the session metadata defined could include definitions for protocols for accessing the application, as well as a definition of resources needed for that application session. Accordingly, all of these data and metadata requirements can be defined in a session definition as a template for that application. Each application can include more than one session definition.

As a further example of schema definitions, workflow definitions 326 can be supported that include definitions of data and metadata that have relevance beyond the user of an application. In some implementations, workflows can define the components and the inter relatedness of components that form an application.

An IAAS platform can provide services in addition to a schema service 302 to facilitate application development. For example, a session service 306 and a workflow service 304 can facilitate the conversion of schema templates such as definitions of an application into functional components of an application 336. Once session data for an application is created based on session definitions, session services can allow sessions with that application to be created and/or used by users. For example, applications on clients 104 can access an application through the session services based on the session data and metadata for that application. Moreover, session services can allow access, through workflow services, to workflow data 310 created on the basis of workflow definitions for that application stored by storage services 222. Combination of session data and the workflow data thus allows an application to be implemented at the server level, which can be accessed through clients 104, and which can access all resources provided by an IAAS engine 202, including access to databases, database query languages, other programming and scripting languages, software services, and other services, as well as any other computing devices that may be part of the system such as computing devices 114 and/or 116. In some variations, at least some of the services may be external to the engine 202 and hosted by computing devices 114 and/or 116.

One of the limitations of typical IAAS implemented applications is the inability to access certain hardware components such as peripherals and resources connected to interfaces and busses such as PCI, USB, EtherCAT, Modbus and others. For example, for cloud based systems, access to interfaces for robotic arms 130, cameras 120, and other hardware components are difficult to obtain, since, for example, the VMs residing on a network do not typically have drivers for such interfaces. Indeed, as shown in FIG. 1, in some implementations, the hardware components may be located on computing devices external to the servers 112.

Figure 5:
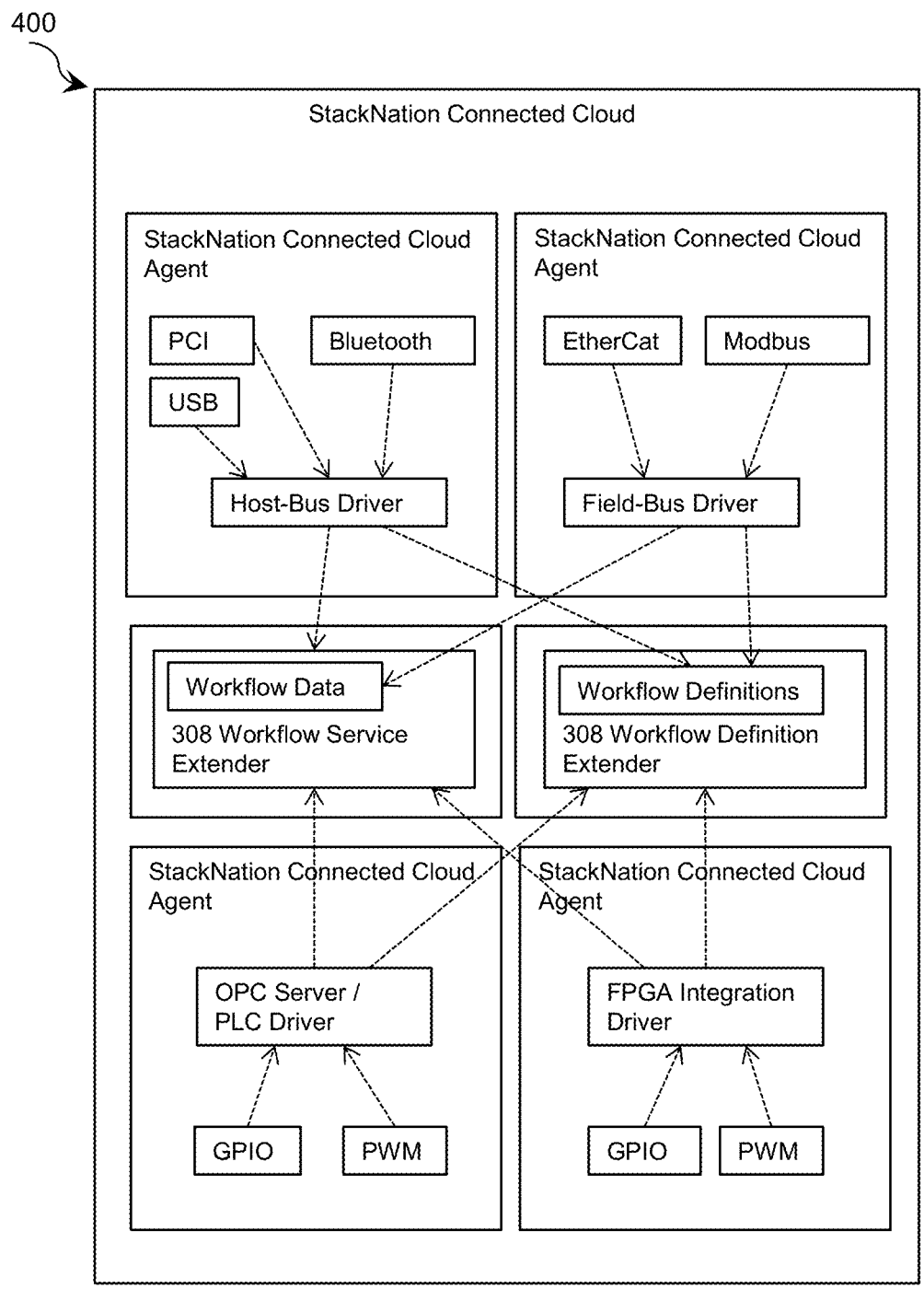
FIG. 5 shows a block diagram of another example virtualization system.

Extensions 308 to schema services and workflow services can be used to provide access to normally inaccessible hardware components, such as peripherals 121. Referring now to FIG. 5, application workflow definitions can be extended to allow inclusion of workflow templates that define access mechanisms for interfaces and busses and such, including mechanism to access appropriate drivers. The hardware components and/or interfaces may be collocated or directly interfaced with one or more of hardware aspects of servers 112, or maybe associated with external computing devices such as computing device 116 accessible by servers 112. Extensions to workflow services can accommodate gathering hardware component metadata based on the extended workflow definitions, enabling rapid building of applications for IAAS platforms that include access to hardware interfaces and components. Applications using extended services provided by IAAS platforms can perform a wide range of functions. For example, in one implementation, applications that can perform tasks based on complex data analysis can be built. The components of these applications can be defined with workflow and session definitions created using the schema services, and accessed as fully working applications using the session and workflow services.

Figure 7:
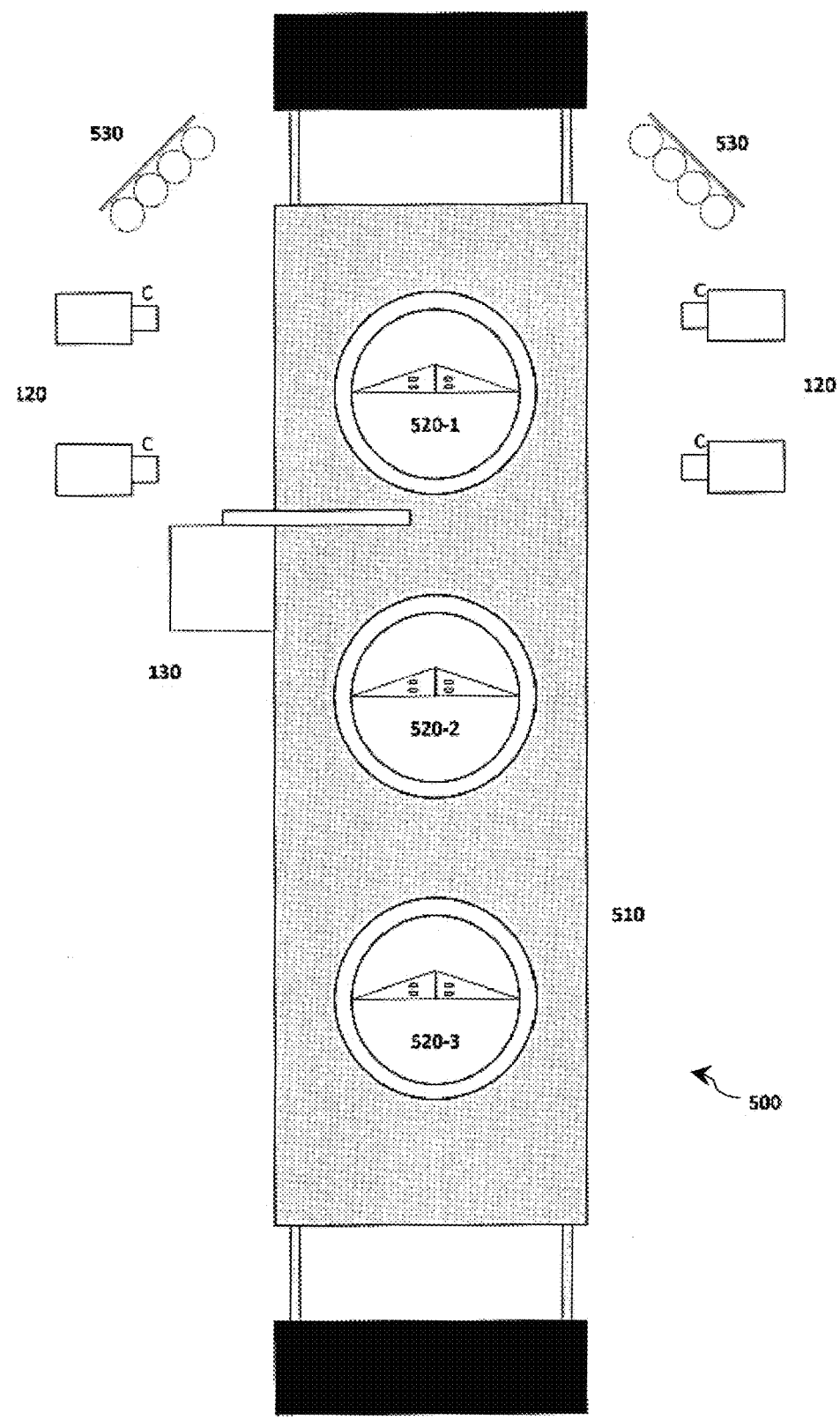
FIG. 7 shows a block diagram of an example conveyor belt in an implementation for monitoring manufacturing quality.
Figure 8:
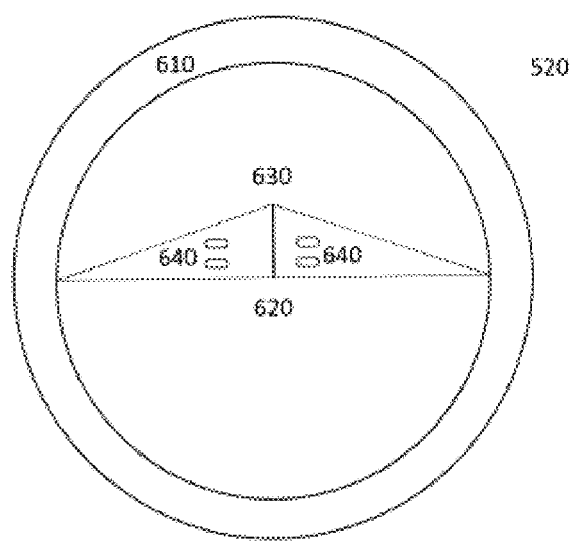
FIG. 8 shows an idealized diagram of an example steering wheel in the implementation for monitoring manufacturing quality.

To illustrate an extended IAAS application based on extended services, an example of an auto parts quality verification application will be discussed below with reference to FIGS. 7 and 8. It should be noted that this is only one type of application that can be implemented, and the general methods can be used to build applications with wide range of functionalities and applicability.

Figure 6:
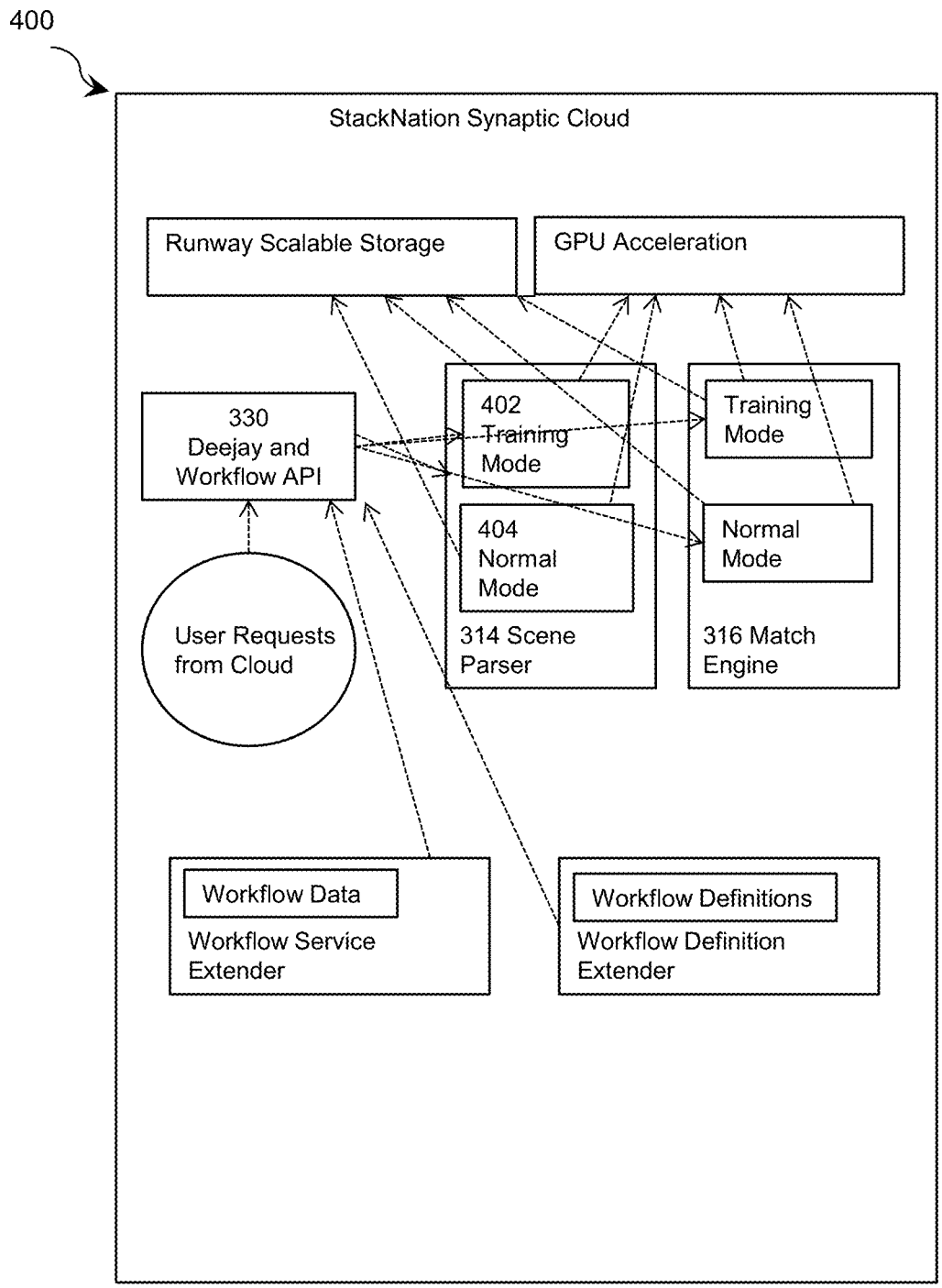
FIG. 6 shows a block diagram of an example application based on the system of FIGS. 1 to 3.

Referring now to FIG. 6, simplified example application architecture is shown. An API 330 of the access module 229 allows access to the workflows for the example application. The workflows include definitions and data and have access to appropriate additional services such as a scene parser 314 and a match engine 316, of the classification and analysis services 224, as well as other services, such as scalable storage and databases of the storage services 222. The workflows may also receive input and provide output to client applications through the access module 229, and though a workflow interface and session services (not shown) as appropriate. The workflows comprising the example application may also have access to peripherals 121 including hardware components such as cameras, conveyor belts and robotic arms.

Referring now to FIG. 5, a block diagram of a conveyor belt assembly is shown at 500. An example application will be described with respect to FIG. 5 for illustration. The example application can have access to and/or control of one or more of the peripherals and hardware components of a conveyor belt assembly. Specifically, the example application has access to and/or controls peripherals 121 at a specialized facility 244, the peripherals comprising a conveyor belt 510, cameras 120, lights 530 and a robotic arm 130. A conveyor belt 510 conveys steering wheels 520 up towards the cameras 120. A robotic arm 130 can gate the movement of steering wheels for fine positioning and/or for detailed imagery by the cameras 120. Lights 530 can provide appropriate lighting for image capture by the cameras 120. It is assumed that all of these components can be accessed and/or controlled through one or more computing devices such as client 104, computing device 116 and/or servers 112 of FIG. 1. In one implementation, this access and/or control can be obtained through extensions to schematic services and workflow services. The extensions to schematic services can allow developing extended workflow definitions that include drivers for hardware interfaces and components. Accordingly, extended workflow services can allow access to hardware interface and/or component metadata based on the extended workflow definitions, enabling the example application to include access to hardware components and/or interfaces of the conveyor belt assembly 500. For example, the example application may be able to, through workflow and session services, control direction and brightness of the lights, control the motion of the conveyor belt 510, control precise positioning of a steering wheel 520 being imaged through the robotic arm 130, control positioning for cameras 120, and obtain images from the cameras 120, and obtain other appropriate sensor information from other components not shown. Hardware access and control may be facilitated, in part by the computing devices 114 and 116. Client devices 104, however would only need to access the example application through the session services provided through the IAAS, greatly simplifying the complexity for front end applications residing on clients 104.

Referring to the control of positioning of cameras, steering wheel part and conveyor, an alternate method is provided whereby precise control requirements are relaxed and in its place a part registration software system is provided. This registration system is calibrated by the passing of a known object of known dimensions on the conveyor (this object is termed the pylon) under the camera view; that when the pylon is detected and recognized the system determines the camera position relative to the conveyor and pylon by analysis of the image dimensions of the pylon relative to its known dimensions; based on the camera position relative to the conveyor and pylon, a transformation matrix is defined which can be used to compensate for change in position of the camera relative to the conveyor that differs from the position that was assumed and used for training the system. Also, the parts may be placed free-hand on the conveyor such that a small degree of rotation does not negatively impact the ability of the system to identify the steering wheel or determine the presence or absence of defects in the part. This is termed: jig-free inspection in that a physical jig is not required to accurately align the part with respect to the camera.

Referring back to FIGS. 3 and 6, the scene parser 314 is a service for parsing data from a scene and providing a break-down of the scene into appropriate components, sub-components and others. For example, referring to FIGS. 7 to 8 showing an implementation of the systems for monitoring manufacturing quality, a steering wheel 520 may comprise the scene. Components of the steering wheel may include the circumference 610 used for performing the steering, and panel 620. The panel 620 may include as components an air bag, behind the slit 630, and control buttons 640, which would be the sub-components of the steering wheel 520. As it will be understood, there may be many levels of components. For example, a scene may have sub-components, the sub-components themselves may have components, which may themselves have components, and so on and so forth. The scene parser can be capable of performing a breakdown of a scene to all of its components and sub-components at any level. In one implementation, the analysis of a scene and the breakdown of the scene to its components can be based on computational modules 318. Computational modules can be implemented using any computational paradigm capable of performing data analysis based on various methods such as regression, classification and others. In some variations, the computational module can be learning based. One learning based computational paradigm capable of performing such methods may be a neural network 320. Neural networks may include Restricted Boltzmann Machines, Deep Belief Networks and Deep Boltzmann Machines. Accordingly, neural network based modules 320 can be used to perform scene breakdown by the scene parser. Thus, data representing a scene, such as images, video, audio and other data, as well as relevant data from databases and other services, can be provided to a neural network, which can perform a scene breakdown based on classification/regression or similar methods.

In some variations, neural networks 320 can operate in at least two modes. In a first mode, a training mode 402, the neural network can be trained (i.e. learn) based on known scenes containing known components to perform a breakdown. The training typically involves modifications to the weights and biases of the neural network, based on training algorithms (back propagation) that improve its scene parsing capabilities. In a second mode, a normal mode 404, the neural network can be used to perform the breakdown of a scene. In variations, some neural networks can operate in training and normal modes simultaneously, thereby both performing a breakdown of a given scene, and training the network based on the breakdown performed at the same time to improve its parsing capabilities. In variations, training data and other data used for performing parse services may be obtained from other services such as databases or other storage services. Some computational paradigms used, such as neural networks, involve massively parallel computations. In some implementations, the efficiency of the computational modules implementing such paradigms can be significantly increased by implementing them on computing hardware involving a large number of processors, such as graphical processing units.

Figure 4:
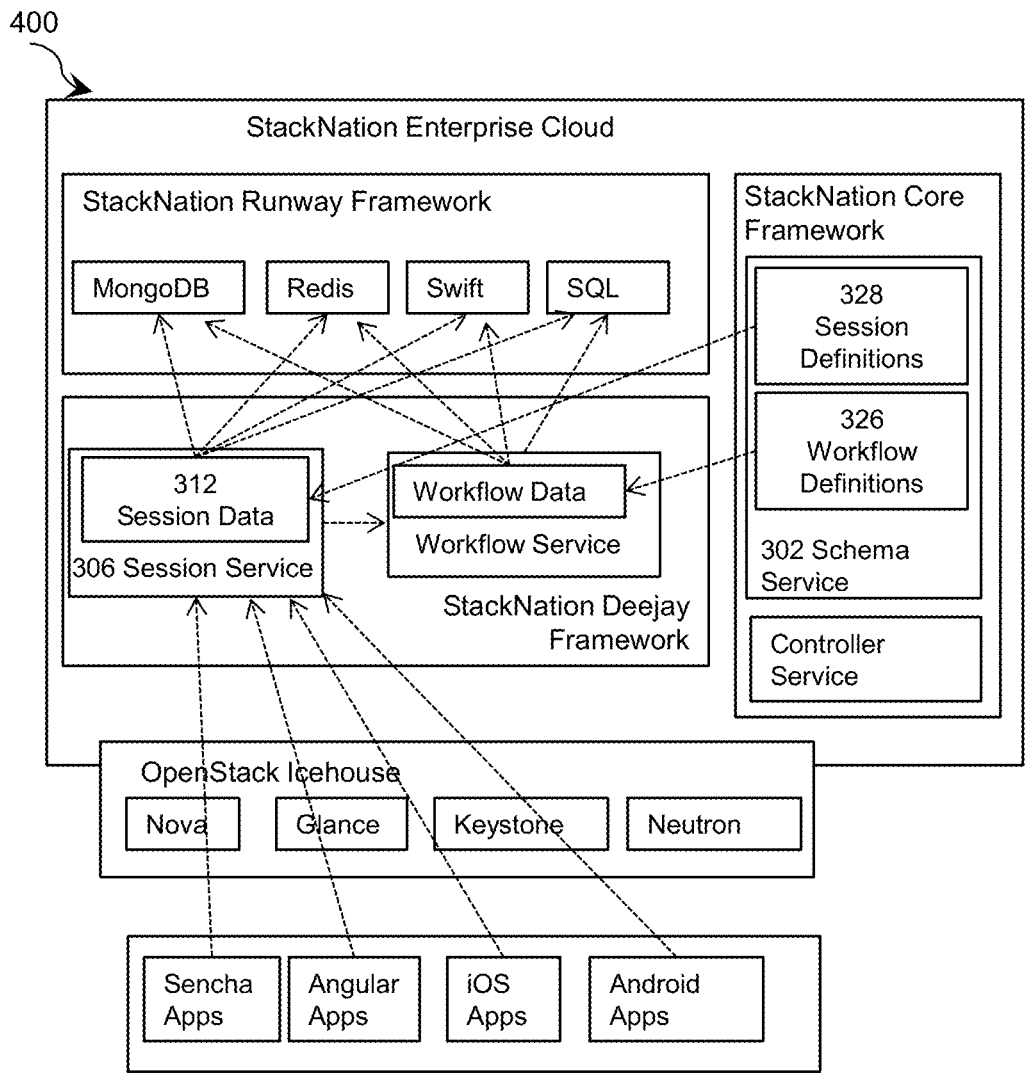
FIG. 4 shows a block diagram of an example virtualization system.

Continuing with FIG. 4, a match engine 316 is a service for analyzing data from a scene and/or the scene parser to identify the scene components and thus the scene. The match engine may utilize data from other services such as database or other storage services to perform its functions. In one implementation, the identification can be based on computational modules 318. Computational modules for the match engine 316 can be implemented using any computational paradigm capable of performing identification based on various methods such as regression, clustering, classification and others. In some variations, the computational modules can be learning based. One learning based computational paradigm capable of performing such methods are known as neural networks. Accordingly, neural network 320 based modules can be used to perform identification by the match engine. Considerations discussed previously regarding neural network implementations in light of parser services are also applicable to the implementation of a match engine using neural networks. Accordingly, the match engine may also be operated in a training mode and a normal mode.

In embodiments, analysis and classification services may thus be implemented by providing input data to a neural network, such as a feed-forward neural network, for generating at least one output. The neural networks may have a plurality of processing nodes, including a multi-variable input layer having a plurality of input nodes, at least one hidden layer of nodes, and an output layer having at least one output node. During operation of a neural network, each of the nodes in the hidden layer applies an activation/transfer function and a weight to any input arriving at that node (from the input layer or from another layer of the hidden layer), and the node may provide an output to other nodes (of a subsequent hidden layer or to the output layer). The neural network may be configured to perform a regression analysis providing a continuous output, or a classification analysis to classify data. The neural networks may be trained using supervised or unsupervised learning techniques, as described below. According to a supervised learning technique, a training dataset is provided at the input layer in conjunction with a set of known output values at the output layer. During a training stage, the neural network may process the training dataset. It is intended that the neural network learn how to provide an output for new input data by generalizing the information it learns in the training stage from the training data. Training may be effected by back propagating the error to determine weights of the nodes of the hidden layers to minimize the error. Once trained, or optionally during training, test (verification) data can be provided to the neural network to provide an output. A neural network may thus cross-correlate inputs provided to the input layer in order to provide at least one output at the output layer. Preferably, the output provided by a neural network in each embodiment will be close to a desired output for a given input, such that the neural network satisfactorily processes the input data.

Workflows, comprising workflow definitions and data, can be used to define precisely how to utilize scene parsing and matching in an application. For example, workflows may operate using operational states, in a manner similar to a finite state machine ("FSM"). At each operational state, a workflow may receive inputs from clients 104, from one or more hardware components, from scalable storage, from the scene parser and from the match engine. Based on all of these inputs, the workflow may generate one or more outputs and/or effect a state change. The outputs may involve changes to hardware such as movement of the conveyor belt or a change in lighting quality, as well as data that may serve as input to other components of the application. Outputs may also involve data provided to client applications running on clients 104 through session services, as well as data written to scalable storage services and others that will now occur to a person of skill.

As a simplified example, the workflow components may define moving the next steering wheel into position to be imaged by the cameras as a first application state (position object). The positioning can be monitored through inputs from the cameras and controlled through outputs to control the motion of the conveyor belt using the extended workflow services. Once the steering wheel is appropriately positioned, the application may enter, based on the workflow definitions and data, the next operational state, the recognition state. If the object cannot be positioned an error may be indicated to perform manual inspection of the conveyor belt. In the recognition state, the application may cause, as outputs, lighting to be chosen such that the scene parser module can properly break down the steering wheel 520 into its components, such as the steering radius 610 and the panel 620. The scene parser may provide input to the operational state indicating any changes that might be needed in lighting and position until the breakdown can be successfully performed. Upon indication of success, the matching engine may be invoked to match the identified components of the steering wheel so that the steering wheel can be recognized as a known type of steering wheel, i.e. indicating a particular part number. The matching engine may use data services to obtain data (or the appropriate matching engine in the form of a neural network for example) to match the identified components to one of the known types of steering wheels. If the operation fails, the wheel may be rejected, indicated as such (for example through the use of the robotic arm), and the next wheel may be brought up for inspection. If the matching operation succeeds, the application may enter the next state of operation where the wheel is inspected for manufacturing defects. The workflows can continue in this manner until the wheel is rejected or accepted as of satisfying quality.

In some high speed applications it may not be possible to subject the part to rapid acceleration and deceleration in order to obtain a still picture for inspection. Consider low friction surfaces and the extra equipment required to control part movement. In some embodiments a high speed camera or video capture device is used to obtain a stream of images (video stream). In this case the system analyzes the series of frames in order to select an optimal frame for further analysis. Frames can be selected such that the background does not confound subsequent image analysis, e.g. when a seam is present in the conveyor belt under the part this can confound foreground/background separation or segmentation. Frames can be selected when the part is in an optimal position, e.g. centered under the camera. Determination of when the part is centered in the frame can be computed by thresholding the image and counting a distribution of binary values. Also, a video stream can image-stitch a long part into a single image when at any one time only a section of the part is visible and in the field of view of the camera.

In some embodiments it may not be desirable to use a lighting source which is diffused. Thus glare can occur on glossy surfaces. Image processing techniques can be confounded by glare since it introduces high intensity values and high pixel intensity gradients. This artifact of poor lighting can introduce errors into feature detection methods based on edges, contours etc. In such embodiments, the frame from a video stream may be selected such that the frame is consistently in the same position relative to the lighting which reduces the effect of the glare to be that of a non-physical feature that may or may not be useful in determining the identity of the part or the presence of defects. Further, the glare can be detected and the area effectively masked from contributing features for classification purposes.

In some embodiments, multiple support vector machine or other classifiers can run simultaneously, i.e. an ensemble of classifiers may be used. A classification ensemble may be homogeneous or heterogeneous. A homogeneous ensemble consists of classifiers of the same machine learning type e.g. a number of support vector machines (SVM). Each classifier in a homogeneous ensemble will have different parameter values and may have been trained in a distinct subset of the samples in the training set. A heterogeneous ensemble consists of classifiers that belong to a variety of machine learning algorithms e.g. a deep neural network as well as K-means clustering and an SVM. Classifiers in heterogeneous ensembles may be trained on the same training data or may have been trained on distinct subsets of the training data. If a multiplicity of a machine learning algorithms exists in a heterogeneous ensemble, each instance of the multiplicity may have been trained on some samples unique only to that instance. All classifiers can inherit an abstract base class which defines an API. A configuration file may be read at execution time that loads a saved classifier model and assigns it to a mode, such as an active or passive mode. The list of classifiers can be iterated through at runtime due to the common inherited API. Active mode classifiers can be trusted with respect to their performance capabilities and may modify some aspect of the manufacturing execution system. For example, active mode classifiers may activate a peripheral, such as a robot-arm to remove a defective part from the factory conveyor belt. Majority vote or similar resolution strategies may be applied when multiple active classifiers are enabled. Further, a confidence value may be assigned to each prediction of a classifier, such as part number predicted by a matching engine classifier. A message consisting of all predicted part numbers may be communicated along with confidence score. Logic based on a production cost function can be implemented to effect desired system behavior. Passive mode classifiers can compute features and run their decision making process but simply log the result to file. Passive classifiers may provide a means to assess alternate parameter values or classifier training methods or features. To minimize processing time, any features that used by more than one classifier in the ensemble may not be recomputed but a feature value can be cached. Caching can be accomplished, for example, with a dictionary data structure of key:value pairs. If decision making depends upon features derived from comparing a sample part to a template, features associated with the template may be static and may be stored as a constant value for runtime access. This may include FFT or wavelet coefficients of the template.

In manufacturing automation implementations of quality inspection systems, it is often the case in quality verification systems that a sample part must first be physically placed into a rigid jig in order to achieve registration and comparison with a quality reference. According to the systems and methods provided herein, in view of the embodiment described with reference to FIGS. 7 to 8 and described in more detail below, it will be appreciated that the components of a scene may not need to be provided in a fixed presentation to sensing peripherals (e.g. a camera system) for quality verification. The image processing software components may have an orientation normalization module which computes an offset angle. The orientation normalization may occur as a pre-processing step before feature vectors are computed. This adaptability on the part of the system reduces the placement tolerances in a part feed system (e.g. conveyor belt).

Although the example application discussed above only uses session, workflow, schema, hardware access and data storage/access services, other applications may use other services provided by the IAAS. For example, VMMs can be used to manage application requirements, and the application may manage its VM requirements dynamically during operation based on its workload. For example, when scene parser or matching engine require large amounts of memory to perform complex scene analysis, the memory use of the VMs may be increased dynamically to accommodate the altered requirements. In variations, the application can be implemented on hardware based servers 112, as opposed to virtualized systems. In yet other variations, only portions of the application may reside in virtualized systems, the rest operating on hardware based servers. Accordingly, performance penalties that may occur due to virtualization may be minimized for portions of the application that are sensitive to such performance penalties. Other variations will now occur to a person of skill.

The above described embodiments provide an overview of the systems, hardware and methods. In the following, with respect to FIGS. 9 to 35, specific implementations and components of the systems will be described in additional detail. Further, particular example methods for use and implementations of the systems will be described.

Figure 9:
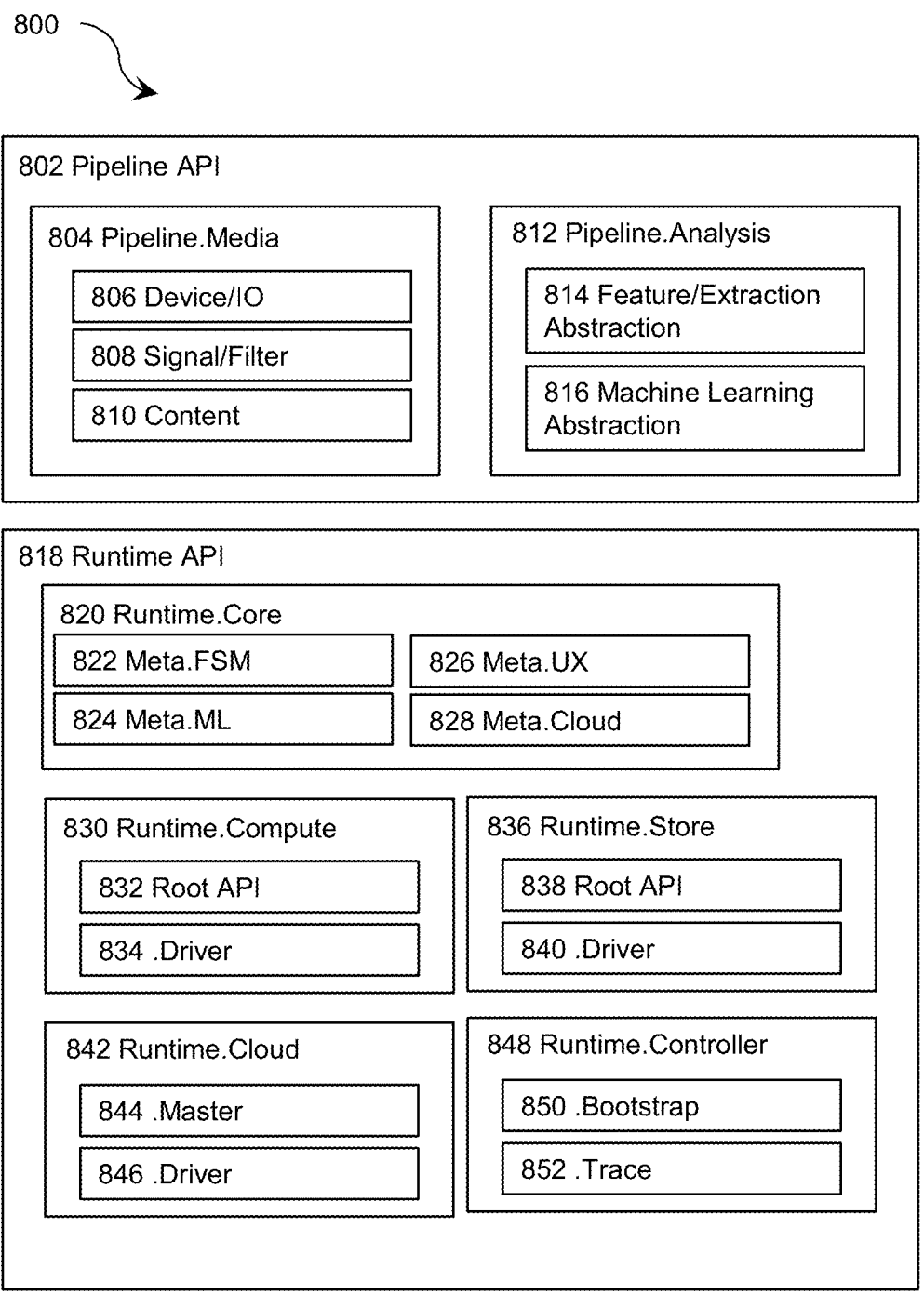
FIG. 9 shows example embodiment of an API configuration and functional layout for an IAAS platform.

Referring now to FIG. 9, shown therein is an example embodiment of an API configuration and functional layout for an IAAS platform, and more particularly for providing access to services of an engine for application provisioning such as engine 202. As described above, the engine 202 may comprise an access module 229 having APIs 230. Particularly, an API 230 may facilitate assessing engine services, including uploading of schema definitions to provide the basis for an application and its associated workflow and session services, as well as providing access to various libraries to implement the described functionality. The illustrated configuration 800 comprises a pipeline API 802 and a Runtime API 818. Pipeline API broadly facilitates uploading media to the engine and accessing classification and analysis services 224. The Runtime API facilitates uploading schema definitions comprising metadata to provision applications, as well as implementing applications.

The runtime API 818 comprises a runtime.core 820, runtime.compute 830, runtime.store 836, runtime.cloud 842 and runtime.controller 848.

The Runtime.Core 820 API receives metadata from client 104 to provide application development for a client and session. Runtime.Core comprises Meta.FSM 822, Meta.UX 826, Meta.ML 824 and Meta.cloud 828. Meta.FSM provides a nested Finite State Machine ("FSM") implementation extended to represent planner or control logic that can drive metadata based instantiation during bootstrap procedures. Meta.UX 826 comprises metadata constructs used to describe a user experience ("UX") layout and operations. The UX layout and operations are interpreted and may be overwritten to produce a desired UX. Meta.ML 824 comprises additional metadata constructs to describe machine learning ("ML") operations and to tie Pipeline.Analysis abstractions together, including storage and distribution requirements, to resources that may be dynamically discovered and removed from the system as made available by interaction with the Runtime.Compute API. Meta.Cloud 828 comprises additional metadata constructs to describe the interaction, dynamic allocation and deallocation, failover, high availability, and other "complete system" state changes. Meta.Cloud is the root level description of a deployment, which may or may not include multi-tenanting and multiple interrelated applications across tenants.

The Runtime.Compute API 830 comprises a root API 832 that provides resource directory service and a job queue client that manages jobs sent to the engine, and .driver that provides access to drivers including GStreamer™, Hardware IO (via e.g. PCI, DMA, Fieldbus), acceleration via FPGA, ASIC and/or GPUs, and provides system library access for machine learning libraries, such as Theano™, Caffe™, etc.

The Runtime.Cloud API 842 comprises .Master 844 and .Driver 846. .Master provides an extension of the Runtime-.Controller class with a base implementation that loads a Meta.Cloud definition, linking the cloud orchestration UX, and each individual link to Runtime.Controller in the system. .Driver provides drivers for the UX such as via JsNation (a javascript framework designed to facilitate Big Data operations)/XAG (XML Accessibility Guidelines), as well as cloud orchestration drivers, such as for Ansible™, Docker™' OpenStack™, AWS or lxc.

The Runtime.Controller 848 class comprises .Bootstrap and .Trace. .Bootstrap 850 is a root class containing runtime nodes. A base implementation loads root FSM which instantiates all runtime objects from metadata driven references. .Trace 852 allows capture, record, storage and playback of all inter object communication for simulation, testing, debug, monitoring, etc.

Runtime.Store 838 comprises a Root API providing access to create, read, update and delete ("CRUD") operations, as well as Object Serialization. Runtime.Store also comprises .Driver 840 which provides access to a framework, such as JsNation's Component Object System COS ("COS") providing the capability to work with divergent data sources.

The Pipeline API 802 comprises Pipeline.Media 804 and Pipeline.Analysis 812.

Pipeline.Media comprises Device I/O 806, Signal/Filter 808 and Content 810. Device/IO streams input from sensors, and may be implemented via drivers to a multimedia handling framework, such as GStreamer™ as indicated in the description of the Runtime API. The Signal/Filter 808 provides image adjustment, including exposure, compensation, stitching, panorama, etc. and may similarly be implemented via drivers to a multimedia handling framework. Content 810 provides access to a data stores driven by Multi-Purpose Internet Mail Extensions ("MIME")-type like content identification and may be implemented by drivers to Jsnation per the runtime API.

Pipeline.Analysis 812 comprises a feature extraction abstraction which may provide feature extraction techniques such as Oriented FAST and Rotated BRIEF ("ORB"), Scale-invariant feature transform ("SIFT") or Extract histogram of oriented gradients ("HoG"), which may be implemented via drivers to computer vision/image processing libraries such as Skimage, OpenCV, SciPy, scikit-image, Tesseract etc., as per the runtime API. Pipeline.Analysis also comprises a machine learning abstraction 816 comprising a capture mode, training mode, and normal mode of machine learning for classification, segmentation and/or regression. The machine learning abstraction may implement Deep Neural Networks ("DNN"), Support Vector Machines ("SVM") and/or Convolutional Neural Networks ("CNN") which can be implemented via drivers to Theano™, Caffe™, etc. as per the Runtime API.

In addition to the libraries described above, the functionality of the systems and methods may be implemented in conjunction with enterprise integration libraries such as Structured Query Language ("SQL") and Enterprise Service Bus ("ESB"); control integration libraries, such as the Robot Operating System, and EC-master stack; video/camera libraries such as Video4Linux2, Ximea xiAPI and GigE Vision. Databases may be implemented by MongoDB to facilitate data integration.

Referring now to FIGS. 10 to 14, shown therein are example methods and implementations of the embodiments described above.

Figure 10:
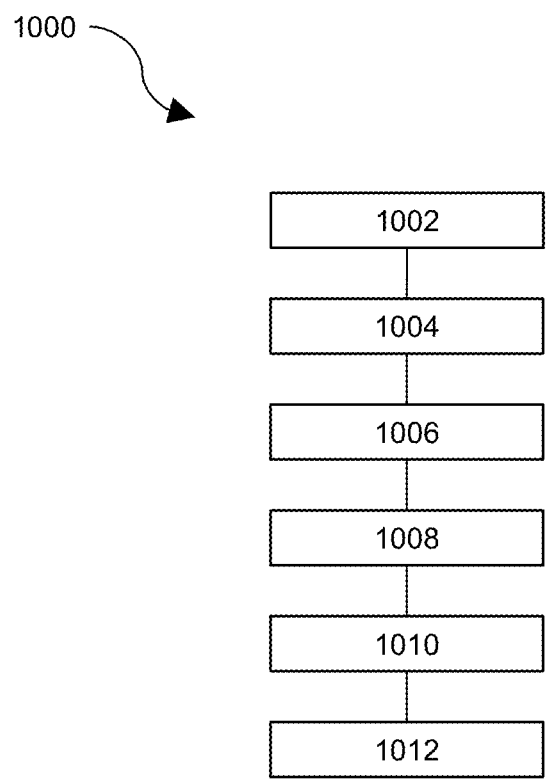
FIG. 10 shows a method for application provisioning.

Referring now to FIG. 10, the systems and methods described above provide a method 1000 for application provisioning according to which, at block 1002 a client accesses schema services of an engine and optionally an extension to the schema services; at block 1004 a schema definition comprising metadata is sent from a client 104 to an engine, optionally comprising information on peripherals connected at a station of a specialized facility 244; at block 1006 an application and associated workflow are generated in view of the schema definition; at block 1008 inputs are sent from the client to the engine from sensors coupled to any connected peripherals, optionally after being pre-processed by a pre-processing module; at block 1010 outputs are generated from the inputs at least in part at the engine; and, at block 1012 the outputs may effect a state change of the workflow and application in view of the inputs. Processing of the inputs at the engine, and pre-processing at the facility 244, may be carried out by computational modules such as neural networks, which may be trained in a training mode before normal operation in a normal mode to process runtime data from peripherals to generate outputs. Processing of inputs at block 1006 may result in dynamic changes to the application (such as state changes), workflows and management of server resources.

Figure 11:
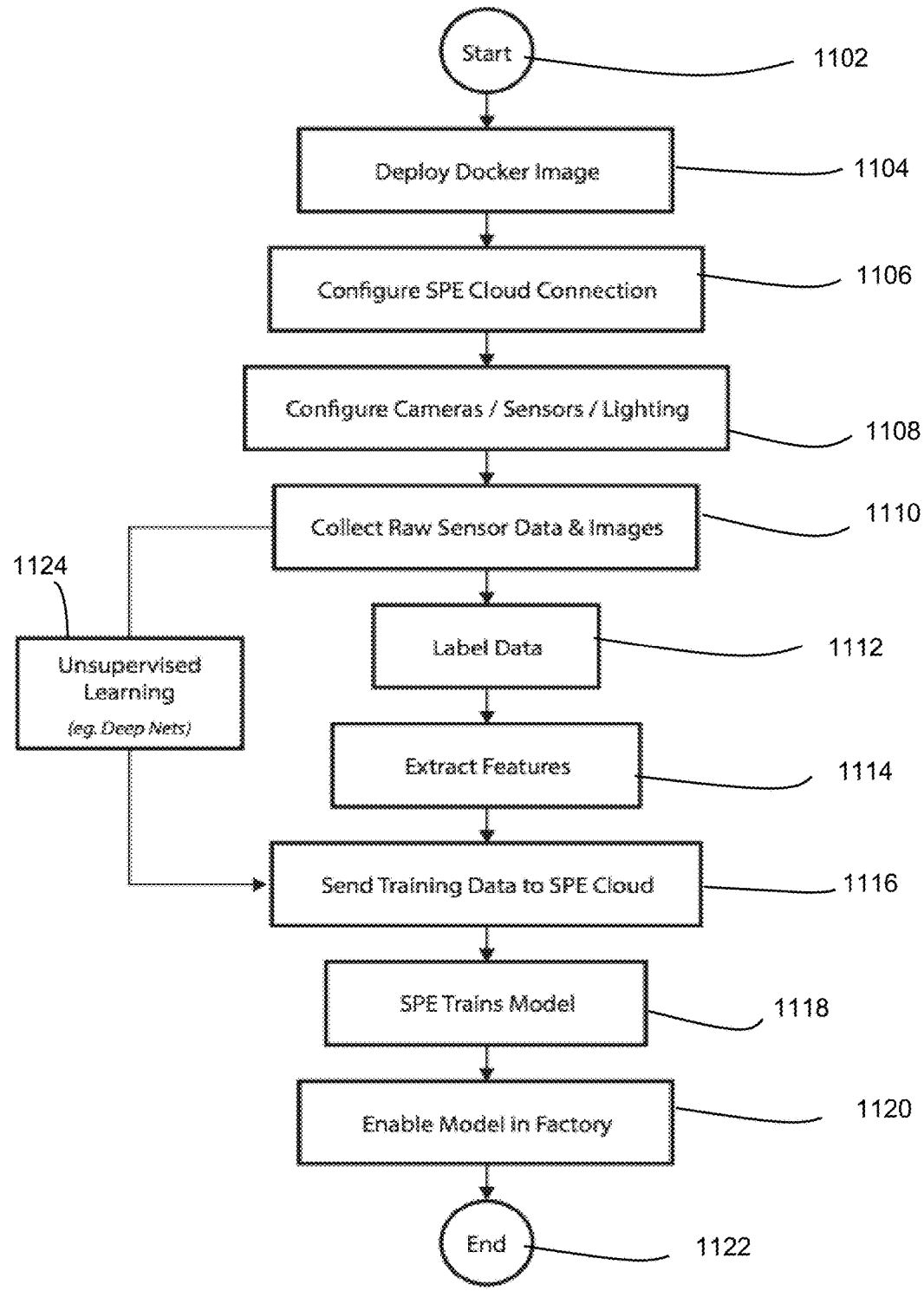
FIG. 11 shows a method for application provisioning at a station of a specialized facility.

Referring now to FIG. 11, shown therein is an example embodiment of a method for application provisioning at a station 238 of a specialized facility 244 and training a classification model for use at the station in a supervised training mode 402. At blocks 1102 to 1106 a connection is established to an engine by a client; metadata and other configuration information is sent using schema services from the station 238 and from the client, which may not be located on the same network as the station. An application, session and associated workflows are generated on the basis of the uploaded information and may be sent to a computing device communicatively linked to the station for execution. At block 1108 peripherals connected to the station may be configured for use with the application and workflows. At block 1110 sensors connected to peripherals at the station 238 collect training data. At block 1116 the training data is sent to the engine. At block 1118 the engine uses the training data to train a computational module, which may comprise a neural network. The training data may be labeled and used as reference data to train the computational module, such as a classification model, in a supervised learning method. At blocks 1120 to 1122 a trained model of the computational module is sent back to the station 238 for use in a normal mode 404. As illustrated, at blocks 1112 to 1114 the raw data may be pre-processed at the site and data may be labeled and feature extraction techniques may be performed locally before sending the features to the engine, minimizing required uploading of data. Alternatively, training may be accomplished at the site and a trained model may be uploaded to the engine. In an alternate embodiment illustrated by block 1124, unsupervised learning techniques may be implemented to generate a trained computational module.

Ground truthing may be implemented to ensure classification result accuracy according to an active learning technique. Specifically, results from classification models may be rated with a confidence score, and high uncertainty classification results can be pushed to a ground truther to verify classification accuracy. Optionally, classification outputs can periodically be provided to ground truthers to ensure accuracy.

Features may thus in some instances be calculated at each of the stations 238 and in some instances utilizing classification and analysis services 224 of the engine. Local computational resources communicatively linked to the sensors may thus be provided to complement computational resources provided in a cloud engine. Feature vectors may thus be computed locally or raw data may be transferred to the cloud prior for computing of feature vectors. Training data may in some instances be collected from local inspection stations or may be collected from cloud storage. Once a model is trained, the classification model may be encrypted, compressed, logged for auditing, anonymized and/or associated with a jurisdictional identifier before transfer to/from the cloud. In unsupervised learning, raw data will be used to train models with little to no human intervention. In supervised learning, users may manually select feature sets to be used in the training process. Locally trained models may be activated when classification accuracy reaches acceptable levels. Locally trained models may be employed on the machines they are trained on, or deployed on other local machines. Locally trained models may also be pushed to the cloud for reconfiguration, further training, or analysis. Alternatively, classification models can be trained in the cloud. Cloud training offers the benefits of dedicated hardware (such as a GPU farm 208) for larger models and faster training times. Once cloud trained models are ready, they will be deployed by pushing to a site remotely, or pulling from the cloud from the site. Once deployed, cloud trained models may be pushed back to the cloud for reconfiguration, further training, or analysis. Further, even if a classification model is trained locally, an enhanced classification model can be trained in the cloud to enhance performance, or to account for changes to the configuration of the station (such as manufacture of different parts). An enhanced model can thus be trained in the cloud and then sent to the site 244.

Figure 12:
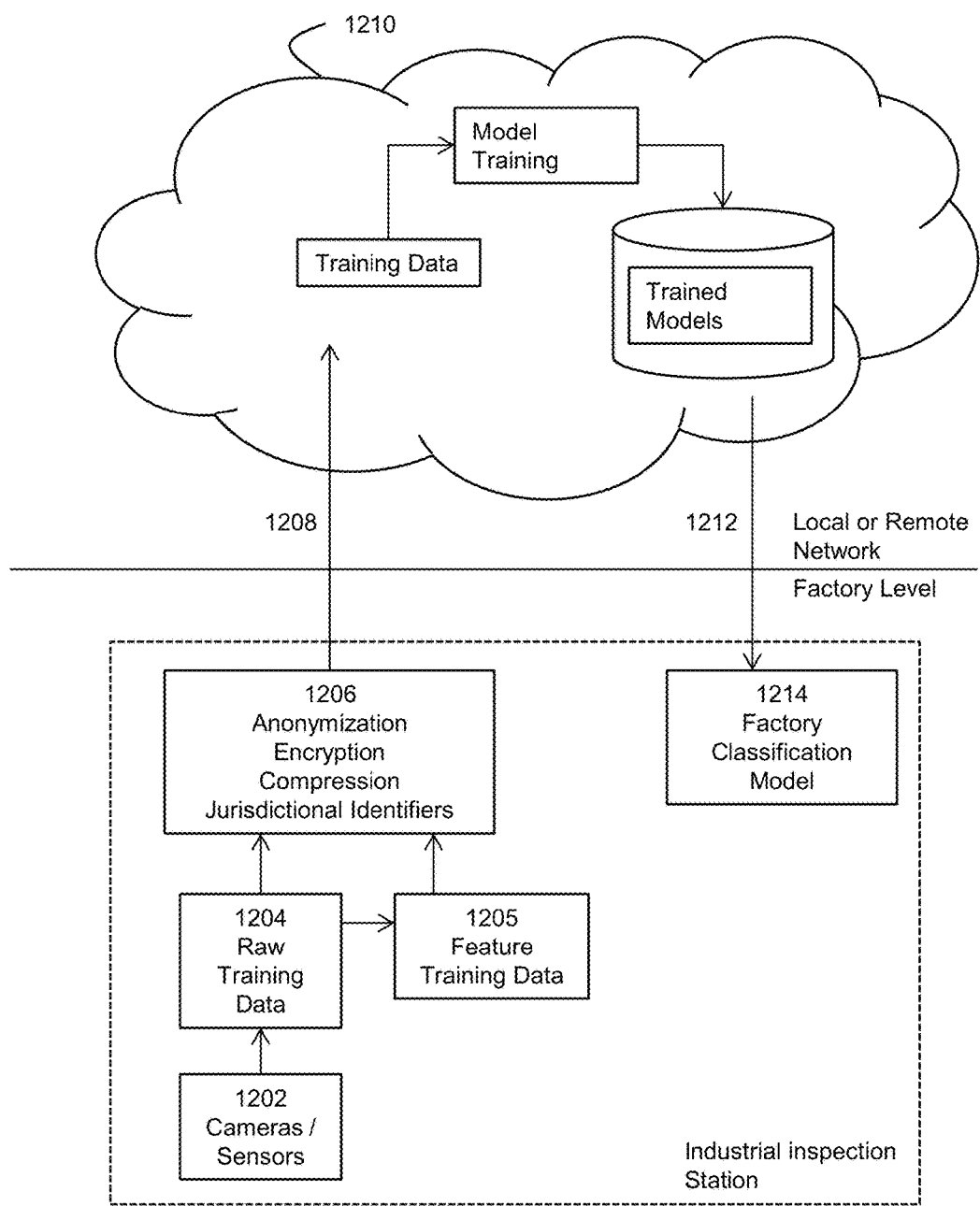
FIG. 12 shows a method for training a classification model.

Referring now to FIG. 12, shown therein is a method for training a classification model. At block 1202 raw data is collected from peripherals and any connected sensors. At blocks 1204 and 1205, raw data may be processed for feature extraction locally or sent for feature extraction to a cloud engine. At block 1206, interface module 240 may anonymize, encrypt, compress data and/or apply jurisdictional identifiers before transferring data to the engine. At block 1208 the data is transferred to the engine. At block 1210 the data is used as training data for training a model in a training mode 402. At block 1212 a trained model is sent back to the specialized facility 244 for use, and particularly for use at the station 238.

Figure 13:
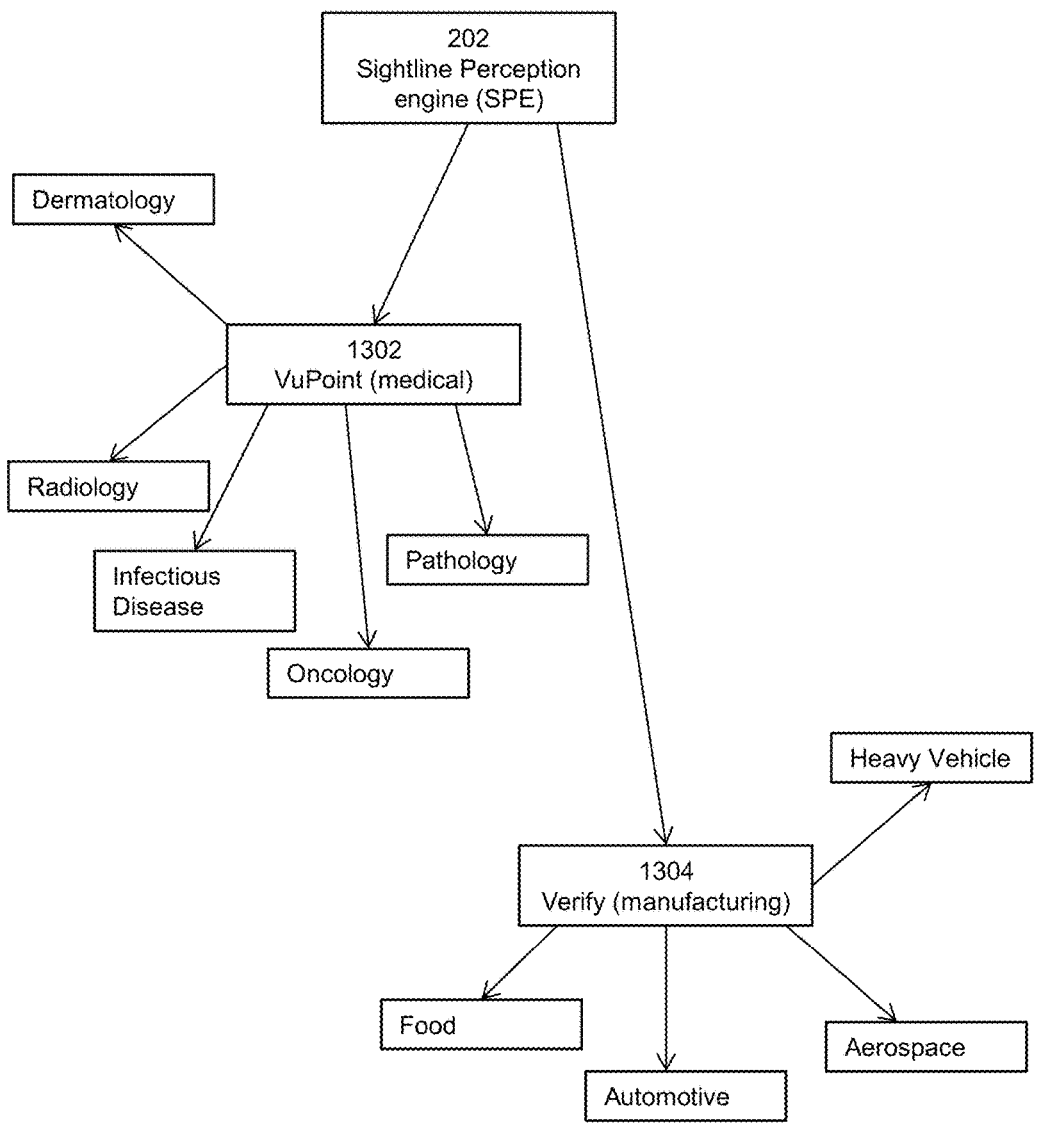
FIG. 13 shows example implementations of the described systems and methods.

Referring now to FIG. 13, embodiments of the systems and methods described above, and particularly the engine 202, may be utilized for myriad implementations, including medical implementations 1302, such as for pathogen detection, and manufacturing implementations 1304.

Figure 14:
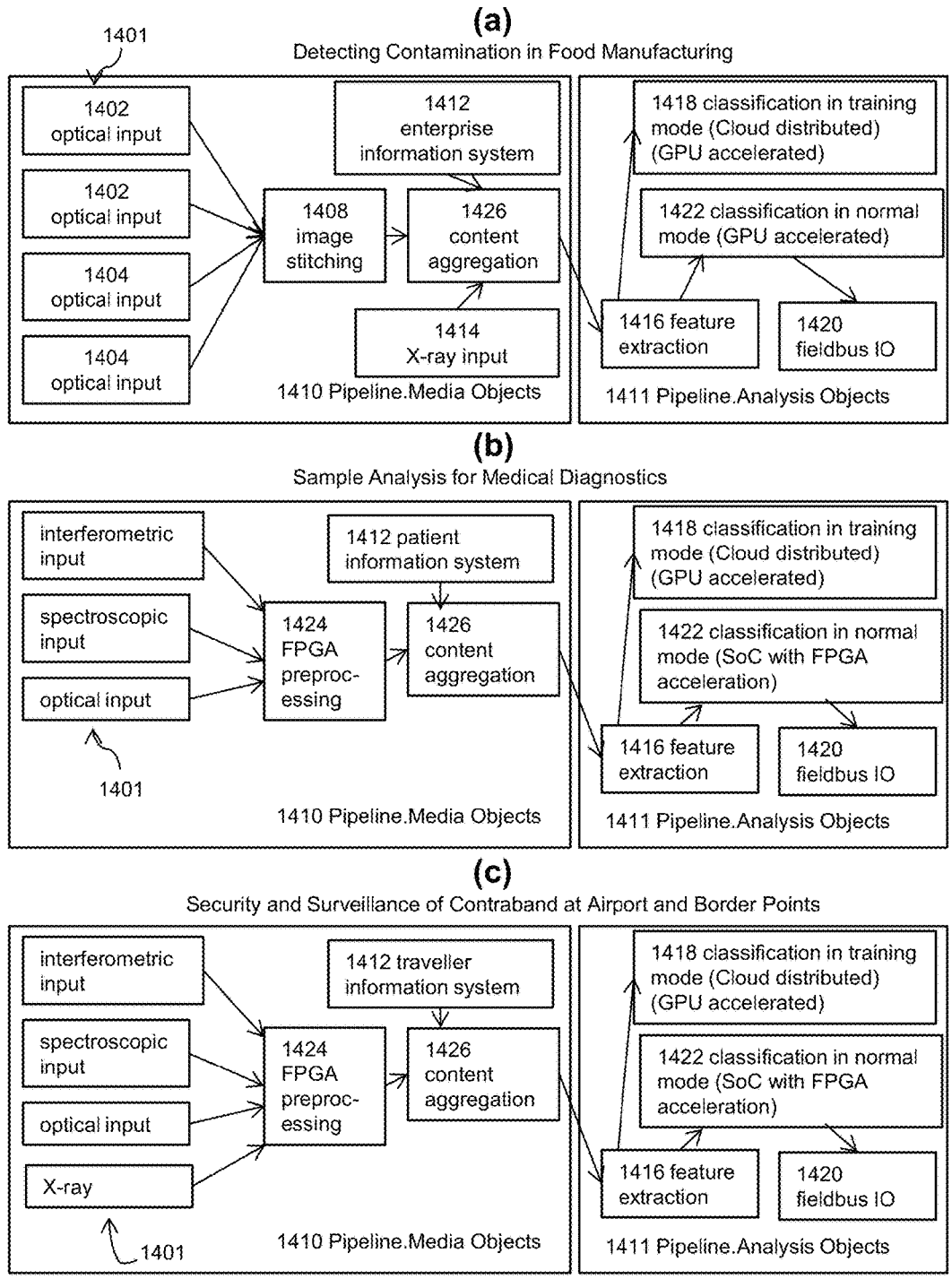
FIG. 14 shows a plurality of flow charts illustrating exemplary implementations of the described systems and methods.

Referring now to FIGS. 14(*a*) to 14(*c*), shown therein are flow charts illustrating exemplary implementations of the systems and methods. FIG. 14(*a*) provides an implementation for monitoring manufacturing quality, such as for detecting contamination in food manufacturing or verifying parts quality as in FIGS. 7 to 8. FIG. 14(*b*) provides an implementation for sample analysis for medical diagnostics. FIG. 14(*c*) provides an implementation for security and surveillance of contraband at an airport and border points.

In each of FIGS. 14(*a*) to 14(*c*) inputs are provided from peripherals at block 1401. The inputs may then be pre-processed such as to provide image stitching of optical inputs at block 1408, or other pre-processing at block 1424, which may be carried out by dedicated hardware (e.g. FPGA). Supplemental data may be received from a database, such as an enterprise information system at block 1412 of FIG. 14(*a*), a patient information system in FIG. 14(*b*) or a traveler information system in FIG. 14(*c*). The data inputs and supplemental data may be aggregated at a content aggregation block 1426. A feature extraction technique is then applied to the data at block 1416. The extracted data may then be classified in a normal mode at block 1422, or used for training of a computational module (e.g. a classification model) at block 1418. In a normal mode outputs from the module can be provided as an output, optionally to effect a state change of an application.

In distributed systems, various blocks of the system may be executed at different locations. For example, data inputs at blocks 1402 and blocks 1404 may be received from different locations. Further, feature extraction at block 1416 may be effected at a different location than the classification blocks 1418 and 1422. It may be desirable that certain blocks, such as blocks 1424, 1418 and 1422 be carried out with hardware acceleration performed by, for example, FPGA, ASIC or GPU resources. It will be appreciated that different types of inter-component communications may provided, including TCP/IP, fieldbus, or other types of data communications. Each of blocks 1410 and 1411 may relate to a specific API providing dynamically configurable aspects of a coordinated cloud system, as described above. Particularly, Pipeline.Media objects 1410 relates to the Pipeline.Media API 804 described above. Pipeline.Analysis objects relates to the Pipeline.Analysis API 812 described above.

Different types of sensors/peripherals may be provided depending on the particular implementation to generate inputs for analysis and classification. As illustrated, for the detection of contamination in food manufacturing in FIG. 14(*a*), various optical inputs may be provided, such as an X-ray imaging input 1414. For medical diagnostics, sensors may include interferometric, spectroscopic and other optical inputs, or other sensors as described below. For security and surveillance of contraband, similarly, interferometric and spectroscopic, as well as X-ray, and other optical input can be provided to the systems.

Figure 15:
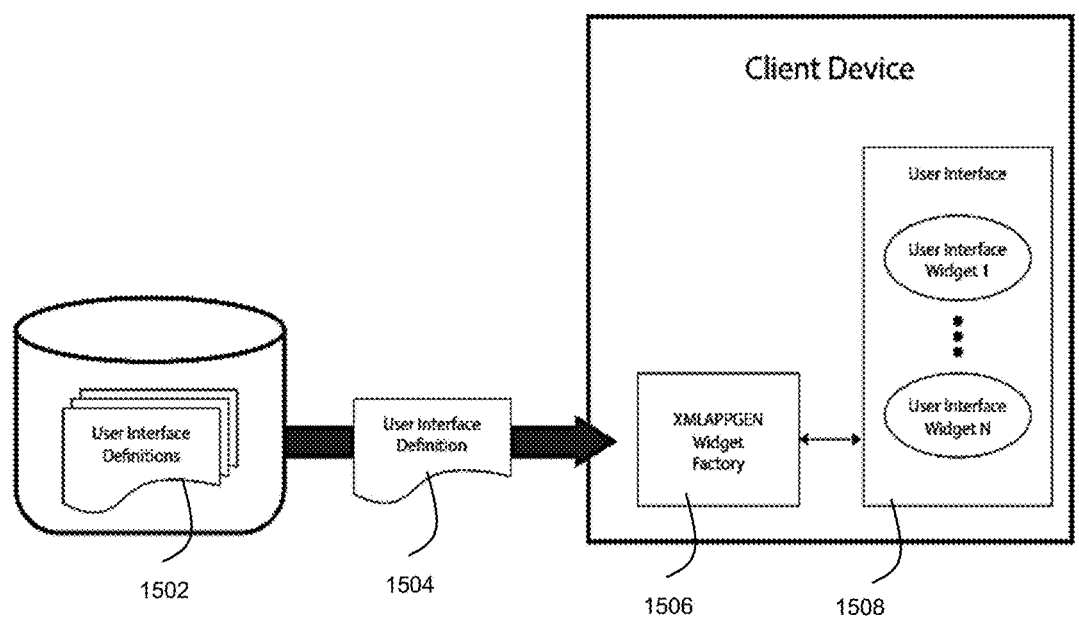
FIG. 15 shows a method for generating user interfaces at a client utilizing the schema services of the systems.
Figure 16:
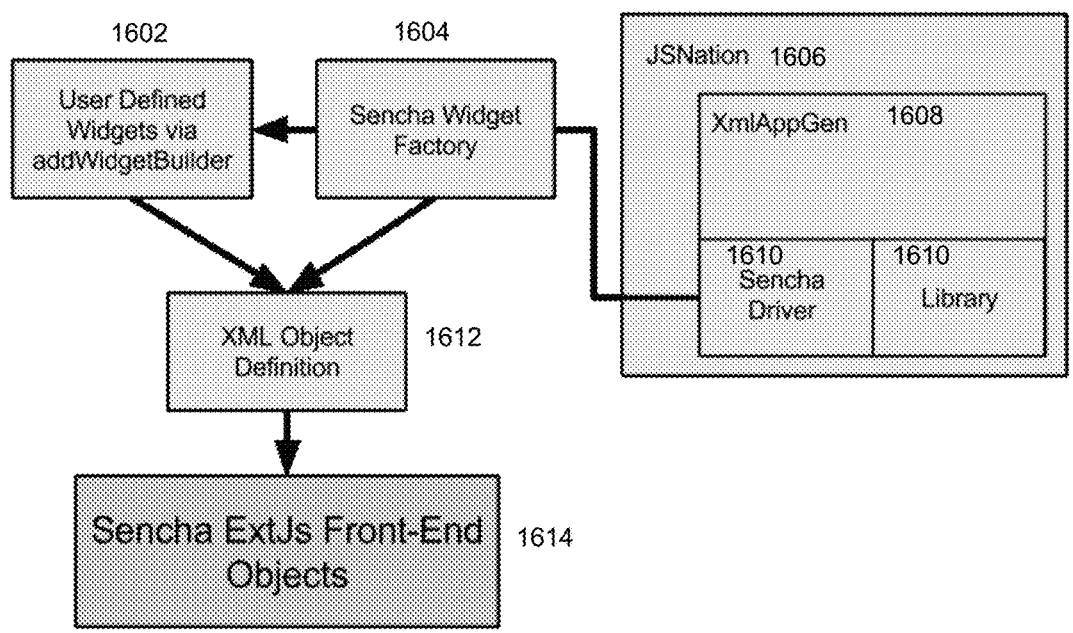
FIG. 16 shows a further method for generating user interfaces at a client utilizing the schema services of the systems.
Figure 17:
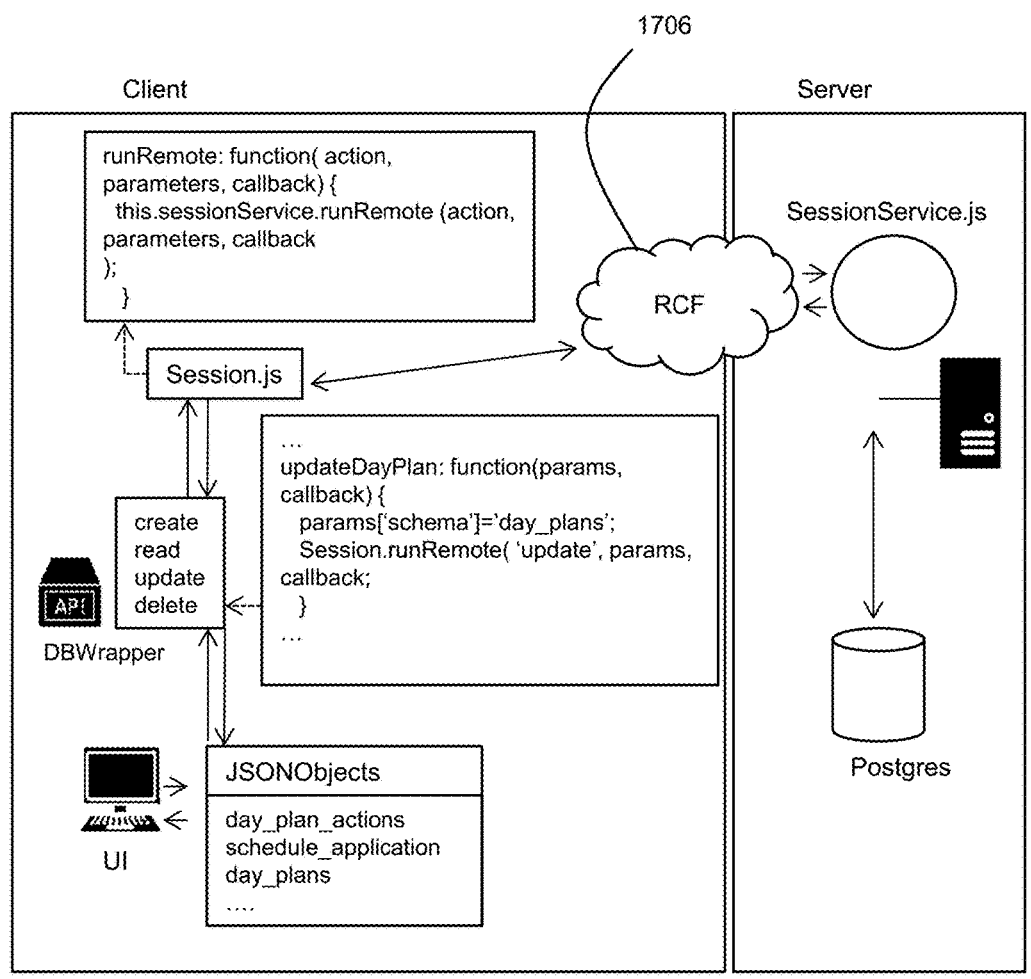
FIG. 17 shows data flow between a server and a client in a method for generating user interfaces at a client utilizing the schema services of the systems.

Various specific implementations of systems and methods will now be described. FIGS. 15 to 17 provide systems and methods for user interface generation. FIGS. 18 to 28 broadly provide embodiments of the systems in implementations for monitoring manufacturing quality. Illustrative user interface screens and wireframe block diagrams will then be described with reference to FIGS. 29 to 35.

Systems and methods for application provisioning are described above, particularly with reference to FIGS. 1 to 6. Schema services are utilized by a client device for uploading data to a platform comprising an engine for application provisioning. Referring now to FIGS. 15 to 17, shown therein are particular embodiments of systems and methods for generating user interfaces at a client utilizing the schema services described above. Particularly, the illustrated method generates a user interface utilizing a user interface generation technique referred to herein as "XmlAppGen".

Referring specifically to FIG. 15, at block 1502 a user interface definition is generated by an engine from metadata provided with schema services to the engine from a client. At block 1504 the user interface definition is provided to the client. At block 1506 XmlAppGen processes the user interface definition in association with a pre-defined library of widget configurations to define customized components of a user interface. At block 1508 user interface widgets are provided as a user interface for a client device.

XmlAppGen includes a set of code-generators that produce application components in various target platforms, including: Sencha Touch™ and Sencha ExtJS™ via JsNation, Node.js server components via JsNation, Python server components via StackNation™, and iOS™ and OSX™ native components using JsNation or StackNation™ server connectivity. Sencha Touch™ is a Model-view-controller ("MVC")-based JavaScript framework for building cross-platform mobile web applications. Sencha Touch™ leverages hardware acceleration techniques to provide high-performance UI components for mobile devices. Sencha Ext JS™ is an MVC/MVVM JavaScript framework for building cross-platform web applications. Ext JS leverages HTML5 features on modern browsers while maintaining compatibility and functionality for legacy browsers.

Referring now to FIG. 16, XmlAppGen 1608 is an XML schema that can be used to declare the high-level structure and functionality of a network distributed application. JSNation 1606 encompasses XmlAppGen which contains an internal library 1610 and, in an embodiment, a Sencha driver 1610. Within the Sencha driver there exists a pre-defined library of widget configurations 1604 along with a method that allows users to define their own custom components 1602. These configurations allow the use of tags in the Xml definition 1612. Finally, the Xml can be translated into a Sencha ExtJs object 1614 matching the previously defined configuration.

Referring now to FIG. 17, shown therein is an overview of how data is transferred to generate user interfaces according to the methods described in relation to FIGS. 15 and 16. The web to server tier is facilitated by JsNation's Remote Procedure Call mechanism. JsNation's RPC framework for javascript is called the Remote Component Framework (RCF) 1706. The RCF can be used to distribute functionality across a network in the form of session objects. Encapsulating functionality in session objects conforms to Object Oriented principles and produces a centralized and in turn a more secure application. The RCF runs on top of socket.io, which comprises multi-platform library-based web sockets. Websockets are an HTTP extension which facilitate bi-directional communication streams. JsNation's RCF also facilitates peer-to-peer communication, as opposed to a traditional client/server model, where efforts are distributed between peers creating less traffic over the network. The underlying communication of RCF occurs over HTTP or HTTPS, thus having access to secure communications through TLS/SSL. This functionality may be driven by the XMLAppGen code generators.

Various embodiments thus rely on features of JsNation. JsNation is a JavaScript library, developed by the applicant of the present application, facilitating a rapid development framework for Node.js and HTML5 interfaces, by providing several different aspects that are brought together to speed up the development process. First, a bi-directional RPC system based on Socket.io and HTTP/HTTPS WebSockets. Also, a schema ORM that integrates SQL and no-SQL datastores in order to make converting data types a simpler procedure. Finally, UI generation tools for Sencha Touch and Sencha ExtJS which minimize development time. JsNation allows software systems to seamlessly connect to components written in various languages on different platforms. By utilizing an enterprise computing framework, integrating with big data stores and cloud deployment systems, JsNation maximizes developer productivity, fostering the flexibility and security. In essence, JsNation is a javascript framework designed to facilitate Big Data operations in online multi-tiered network environments. With the emergence of technologies such as nodejs, HTML5, and websockets, JsNation makes it possible to implement a solution that can ease access to Big Data solutions like MongoDB™, HBase™, and Cassandra™. JsNation is made of up several components that can be used independently or in concert, consisting of the Remote Invocation Framework (RIF), the Object Distribution Layer (ODL), Schema Framework, Component Object System (COS) and the Big Data Abstraction Layer (BDAL). The RIF provides peer to peer communication in the style of remote method invocation, allowing objects to live and communicate with each other on any tier. Due to its flexible infrastructure, objects can also be written in other languages. That is to say, for example, one peer could be written in javascript and another in Python. In order to focus data and data processing, JsNation has a Schema Framework. High level information about data models is defined in schemas, which allow complex operations to be performed on them simply through their schema definition. This makes integration of new data models fast and robust since all the information needed to handle a new data model is defined in its schema. New features can be added since they can use the schema information to carry out their task and then be immediately available to all data models. The ODL meanwhile fosters security, access control, monitoring, logging and tracing, overall enhancing the power and flexibility of the RIF. For example, real time monitoring of communication occurring in a JsNation multi-tier application is possible, allowing fine-tuning of performance features to meet user demands. The ability to work with divergent data sources is fulfilled in JsNation with the COS. It is often the case that such data needs to be corralled and molded into a different format to fit the needs of a specific application. Typically this has been done by building data warehouses that migrate and reformat data. The problem that arises is keeping the data in sync, since every change in the source databases must be migrated into the data warehouse. The COS may resolve this issue by creating a virtual data image directly from the original databases, so any change in the source may be reflected in the virtual image designed for the special application usage. Applications relying on this infrastructure remain current and can allow write backs to persist on the original datastores in real-time. JsNation eases complexity of working with big data clusters with the BDAL, offering clean interface for talking with a backend big data implementation. Whether using HBase™, MongoDB™ or Cassandra™, applications can be written to one standard, and implementations can be changed later. Closely linked to the BDAL is the Cross Datastore Transaction Manager, allowing the user to define transactions to ensure business operations are carried out correctly. This is a two-phase transaction management system that checks all relevant sources before committing data changes to a cluster.

Referring now to FIGS. 18 to 28, implementations of the systems for monitoring manufacturing quality will now be described.

Figure 18:
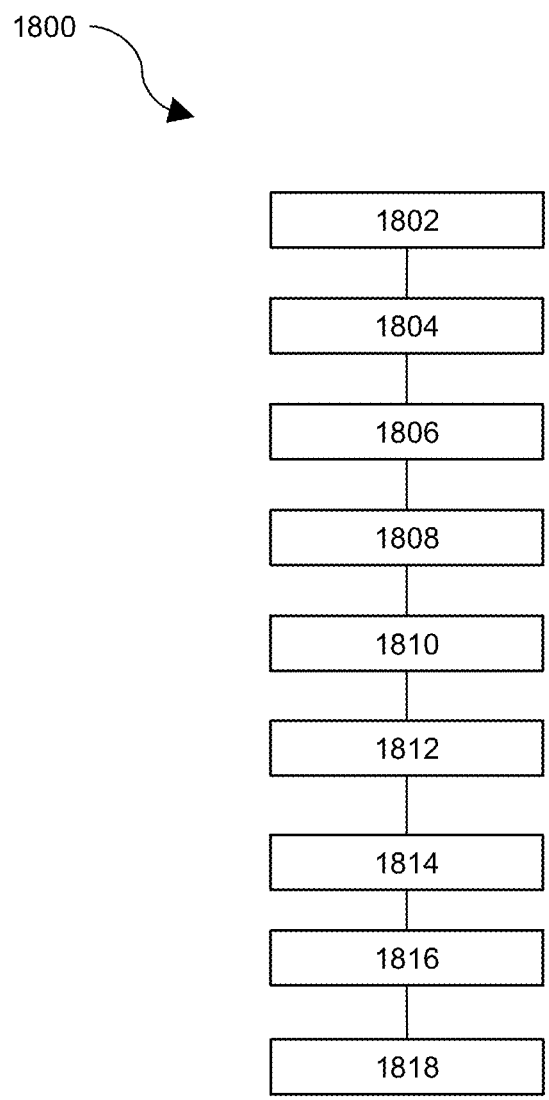
FIG. 18 shows a method for monitoring manufacturing quality

Referring now FIG. 18, shown therein is a method for monitoring manufacturing quality of parts in a manufacturing system, which may not require the use of a rigid jig for holding the parts. The method comprises: At block 1802, capturing input data from a peripheral, such as camera video stream of the manufacturing system. At block 1804, evaluating sequential frames from the video stream; and rejecting frames for which the part is not fully contained, which may be achieved by monitoring pixel values in a line pattern, accounting for glare upon the part which introduce higher pixel values than the part has under other lighting conditions, estimating the beginning and end of the part based on difference in pixel values compared to the conveyor background. Further, any frame that indicates an operator error is rejected e.g. the placement of a sample part on a section of the conveyor belt that has a seam which can affect segmentation of the foreground/background and subsequent feature calculations. At block 1806, selecting a frame for which the part is centered in the frame and as such is a consistent positioning of the part for comparison with a template image. At block 1808, optionally converting the image to a different image file format (eg. RGB, BGR, JPEG, PNG, etc.) such that the video frame undergoes a pixel value modification or compression and such that the sample image frame is provided in the same format as the images that the classifier model has been trained on. At block 1810, computing the outer contour of the part against the background e.g. conveyor. At block 1812, comparing the outer contour of the sample to a template image (reference image) of the part. This reference image could be a computer aided design (CAD) reference file. At block 1814, estimating the orientation of the part to left-handed and right-handed versions of the part by computing pixel-moments or geometrical features which distinguish right- and left-handedness. At block 1816, estimating the degree of rotation of the sample part with respect to a reference image by a method of moments; determining if the sample is the same or opposite handedness based on a threshold applied to the rotation estimate; rotating the sample image such that it is aligned to the template image and calculating further features on the sample image at that point. At block 1818, allowing for a degree of rotation of the sample part with respect to the reference image; rotating the sample image; running a template matching algorithm on the rotated sample image; storing similarity scores for a range of rotations; selecting the maximum similarity score and using the associated rotation value to rotate the image before further features are calculated.

Figure 19:
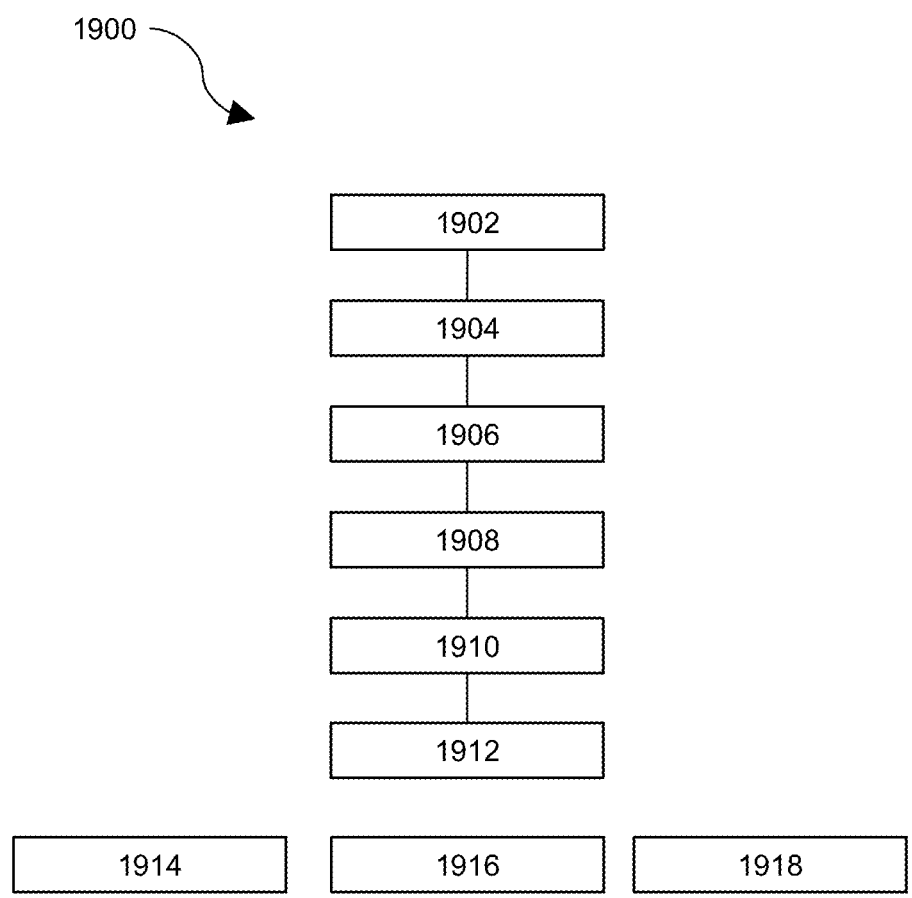
FIG. 19 shows embodiment of a method to update a classification system to account for changes in part numbers, versions, lighting, and other changes occurring at a station of a specialized facility.
Figure 27:
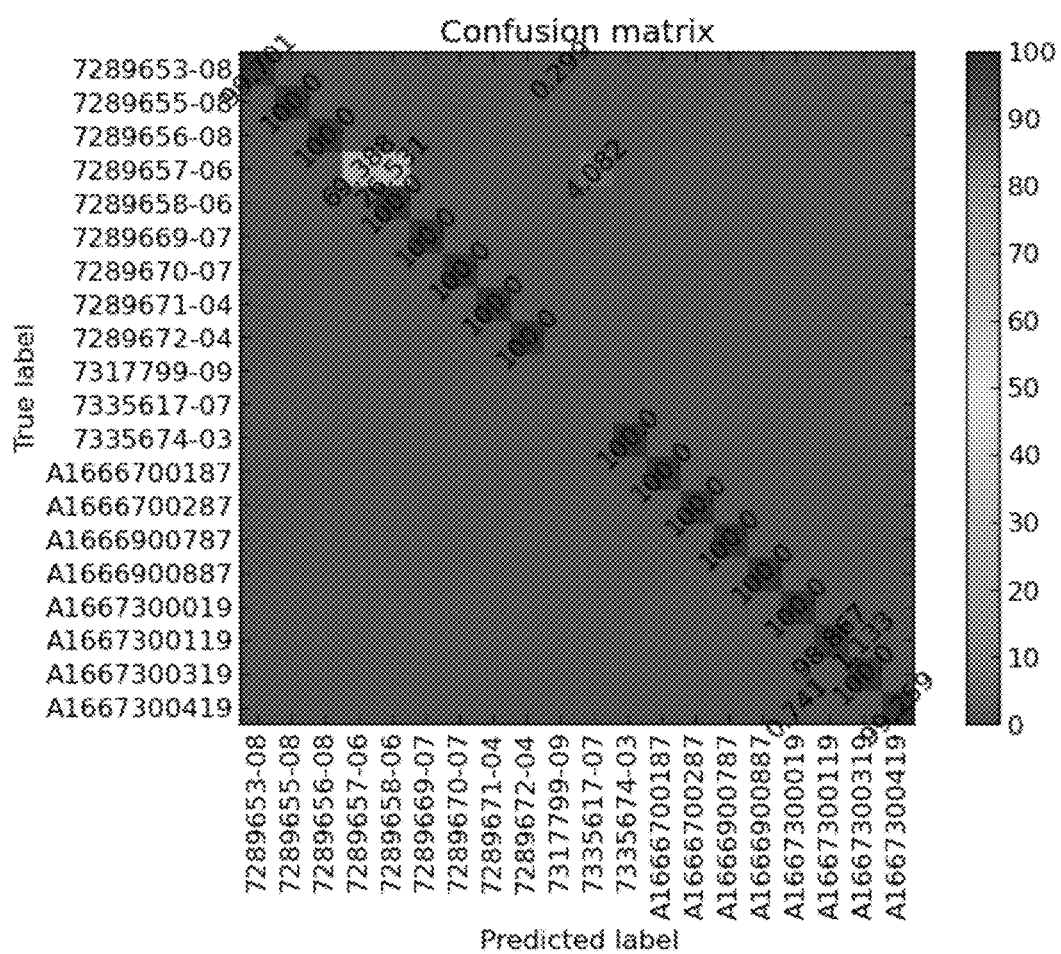
FIG. 27 shows an example confusion matrix for monitoring classifier performance.

Referring now to FIG. 19, shown therein is an embodiment of a method to update a classification system to account for changes in part numbers, versions, lighting, and other changes occurring at a station 238. At block 1902, number and type of sample parts are recorded. At block 1904, an independent factory system records the number and type of sample parts. At block 1906, the two records are compared and a confusion matrix is generated. FIG. 27 illustrates an example confusion matrix. At block 1908, the performance accuracy as documented in the confusion matrix is compared to client-vendor specified acceptable performance levels. At block 1910, log files are reviewed for internal state details that have bearing on the feature values derived and classification decisions. At block 1912, when deficiencies in performance are noted, a system operator and a classification designer in charge of designing the classification model are notified. Deficiencies may result from behavioral deviance of an operator, changes in lighting and introduction of a new/modified part. At block 1914, behavioral deviance of the system operator from defined quality procedures can be determined, such as by measuring placement of the part on the conveyor, e.g. whether the part is on a seam or is too rotated for measurement purposes. These deviances can be logged and manufacturing quality officers notified. At block 1916, lighting changes can be determined by comparing pixel histograms of acquired images with reference images from a calibration session. The operator can be advised to restore an acceptable lighting environment or image transformation methods can be applied such that the trained classification system is robust to such changes. At block 1918, when a new part is introduced, a whitelist file can be used to enable capture of images of certain part types and these images can be transferred to a training server where a new classifier can be developed and re-deployed to the factory.

Figure 20:
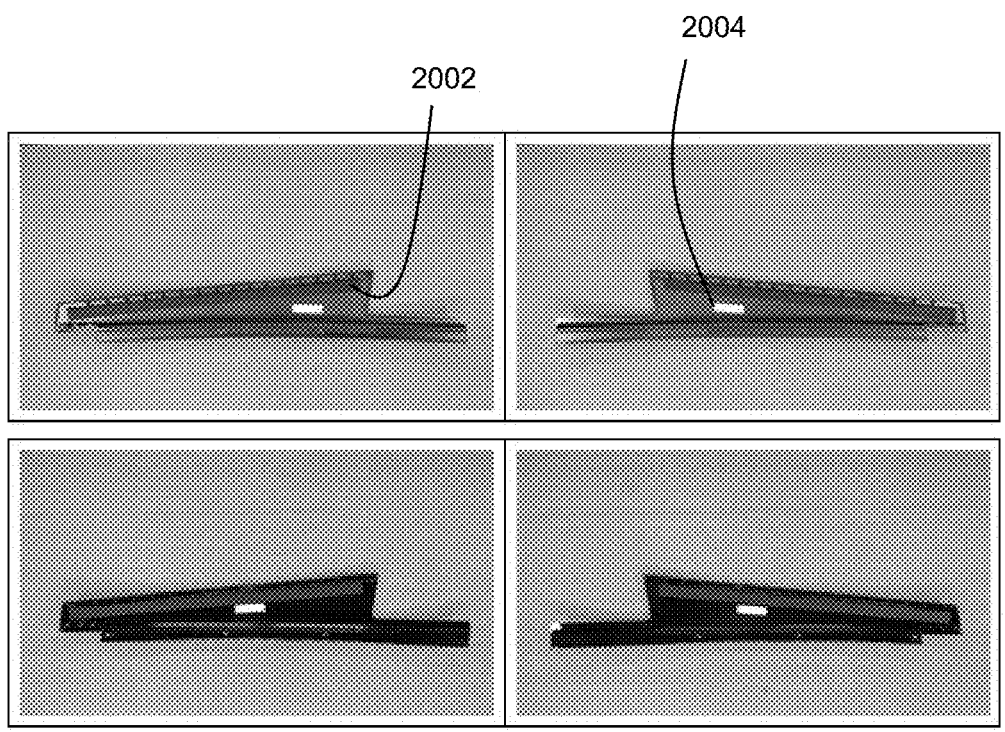
FIG. 20 shows example images of parts having rectangular foam tabs, the presence of which may need to be monitored by systems described herein.
Figure 21:
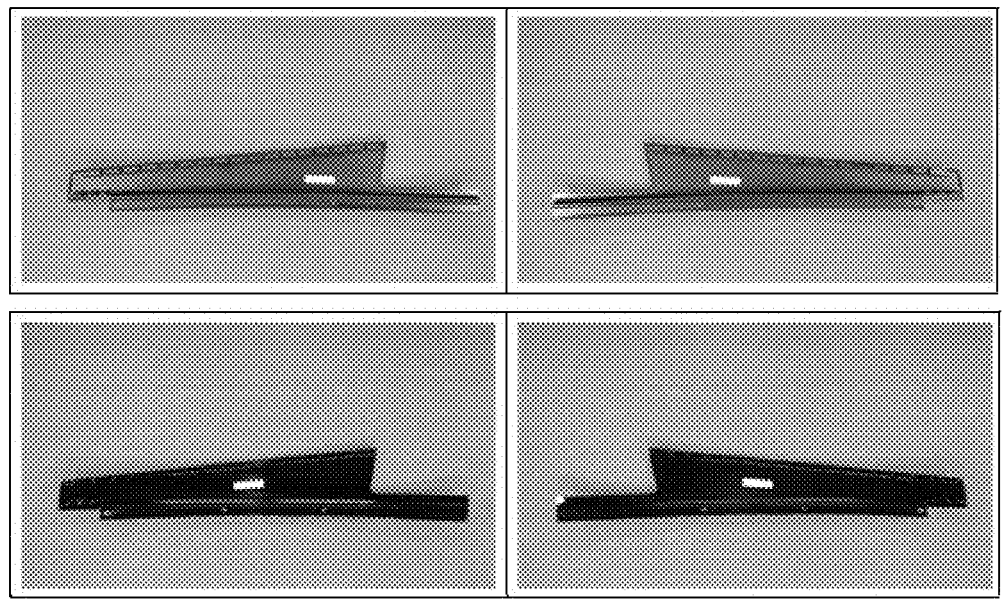
FIG. 21 shows example images of parts missing the rectangular foam tabs.

When training a classification model a predetermined number of images may be required to ensure classification model accuracy. A prerequisite when acquiring, training and deploying systems may be to determine the best lighting conditions, camera position and focus. Once determined, changes to lighting, position or focus may result in misclassification. For example, referring now to FIG. 20, shown therein are example images of parts having rectangular foam tabs, the presence of which may need to be monitored. FIG. 20 shows parts with single rectangular foam 2002. FIG. 21 shows images of parts missing the presence of the foam. Once trained, a classification model could validate the presence of the foam 2002. FIG. 22($a$) and FIG. 22($b$) show images having a low white balance, and a roughly correct white balance, respectively, for identifying the presence or absence of foam on a part. In particular implementations the number of images required to train a new part may be approximately one hundred. Acquiring images can be done through a user interface, by selecting the part number which comes from a database and recording these images. For an exemplary implementation of parts which have foam configurations, foam and no foam configurations can be recorded. After recording images of all parts that the client determines will be needed for the system, the system can be trained on the recorded images. Once trained, the system can classify any of the parts the system has been trained on.

Updating a part can be accomplished by retraining the classifier model. If a new part is identical to a previous part, a part number translator can be used for a one-to-one replacement. Specifically, a part label 2004 may be changed through a translator module which may map the new part label to the old part label and visa-versa. If the replacement part has visible changes, in addition to updating the part label, the classifier model should be tuned. In the embodiments illustrated with respect to FIGS. 20 to 22, for example, where the presence of foam is monitored, tuning the model may comprise updating foam position (in case of change in foam position), updating foam classification threshold (in case of change in foam material) and retraining Principal component analysis ("PCA") and SVM for tab foam detection. If the new part is a part for which the system has never before been trained, then a full training data image set may need to be obtained for the new part. The training data image set can be sent to a cloud server in order to train a model, and the trained model can be returned to the station for use in parts analysis.

Referring now to FIGS. 23 to 27, shown therein are block diagrams of software data flows and components of an illustrative embodiment for use in various applications described herein for providing prediction from a computational module, such as a machine learning model. The embodiments will be described, for clarity of illustration, with reference to monitoring manufacturing quality but can be used for other implementations of the systems and methods described herein.

Figure 23:
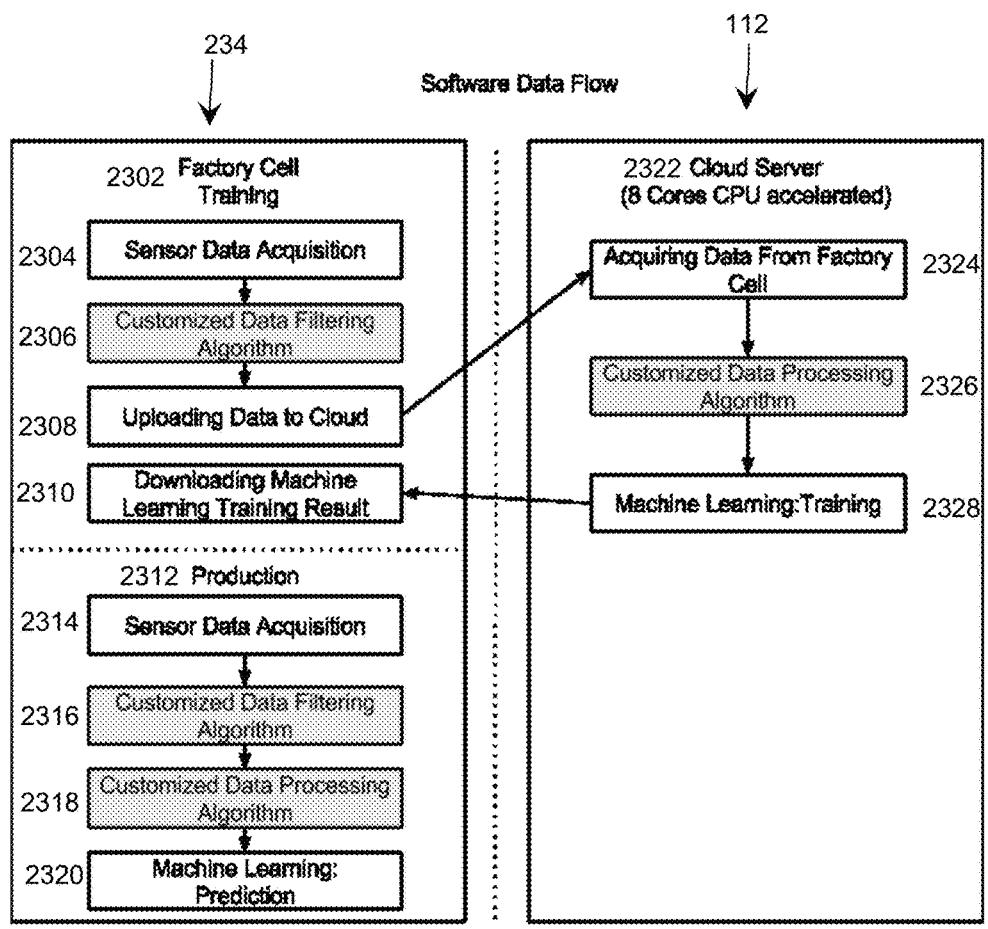
FIG. 23 shows a software data flow for training a classification model and implementing it at a station of specialized facility.

Referring now to FIG. 23, a training mode 2302 of a model for use at a station of a specialized location at the site level 234 comprises: receiving sensor data at block 2304 from connected peripherals and any associated sensors; applying a customized data filtering technique at block 2306; uploading filtered data to the cloud at block 2308 and downloading a trained model from the cloud at block 2310. A cloud engine 2322 of servers 112 may provide training of a model by, acquiring data from the specialized location at block 2324, applying customized data processing techniques to the data at block 2326, and training the model at block 2328, before sending it back to the station. Once the model is trained and provided to the station, the station can operate in a normal mode for manufacturing production 2312, wherein the model is applied to classify data by: receiving data from sensors at block 2314, applying the customized data filtering techniques at block 2316, applying the customized data processing techniques at block 2318, and generating a prediction from the model at block 2320.

Figure 24:
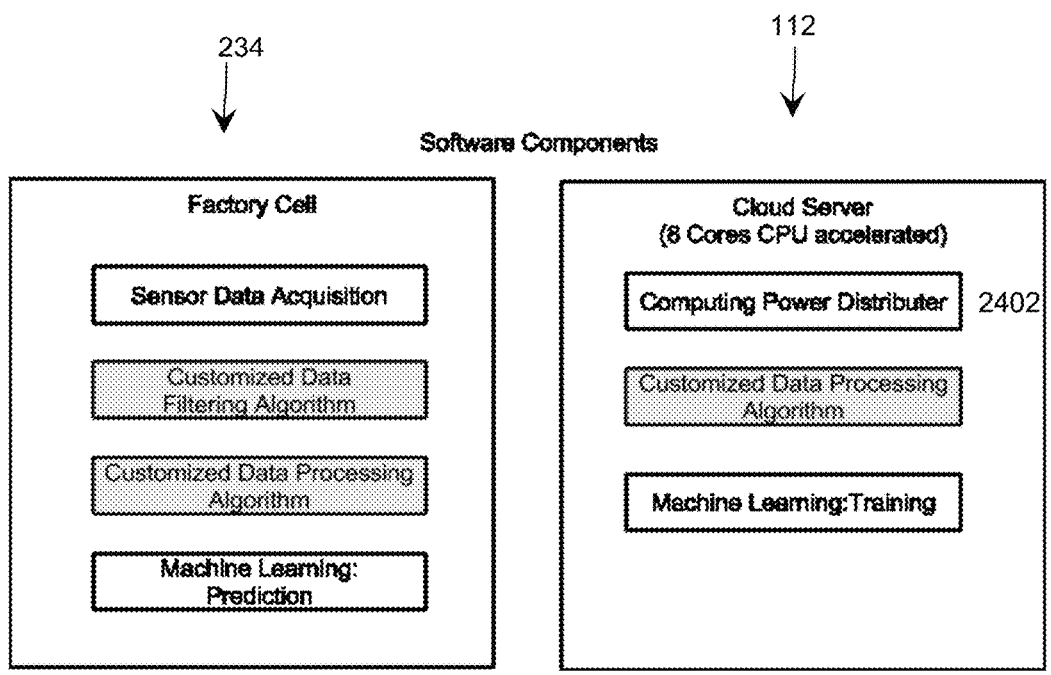
FIG. 24 shows software components that may be required for training a classification model and implementing it at a station of specialized facility.

Referring now to FIG. 24, software components at the site level 234 and at the cloud servers 112 are illustrated. Particularly, software components provide the functionality of each of the blocks described in relation to FIG. 23. Additionally, a software component 2402 may be provided at the server in order to manage server resources.

Figure 25:
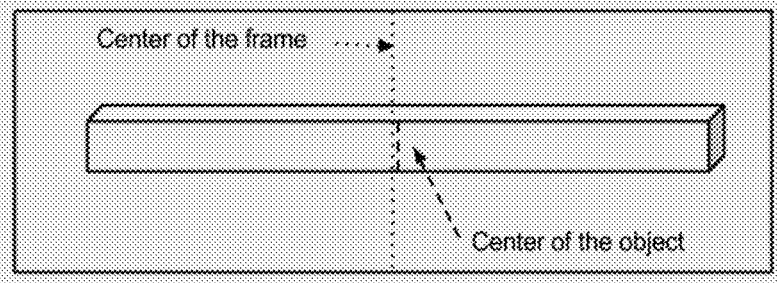
FIG. 25 shows an example data filtering technique.

Referring now to FIG. 25, shown therein is an example data filtering technique for use particularly in an application where an image is provided from a peripheral for analyzing a part shown in the image. Data filtering of each frame may select only image frames wherein the part is shown, the left and right edges of the image frame are not overlapped by the part, and where multiple frames are provided for a part. Further, the first frame where the center of the object is on the right side of the frame may be selected.

Referring now to FIG. 26, shown therein is an example data processing technique for object classification and particularly for distinguishing different parts (or other objects) using image frames which may not be distinguishable by the human eye. At blocks 2602 to 2608 a template pool of images can be prepared. At block 2602 objects in received images can be masked from the background. At block 2604 edge detection can be applied. At block 2606 key points detection may be carried out. At block 2608 key points from a number of image frames are collected as a template pool. Once a template pool is established, the blocks illustrated at blocks 2610 to 2620 may then be carried out to process filtered image frames. At block 2610 the object in each frame can be masked from the background. At block 2612 edge detection can be applied. At block 2614 key points detection may be carried out. At block 2616 the key points can be matched with key points in the template pool (e.g. using Hamming distance), and the presence of the key points in the template pool can be used as input to a machine learning technique. At block 2618 a geometry characteristic, such as length, and an object surface characteristic can be calculated and used as input to a computational module, such as a machine learning classification model. At block 2620 a machine learning model may be applied.

Referring now to FIG. 27, classifier performance can be visualized with a confusion matrix. In the illustrated example, a matrix of parts is shown with each cell representing how the classifier assigns a part label to the sample-under-test, such as samples under test on a conveyor belt in a manufacturing quality implementation.

Figure 28:
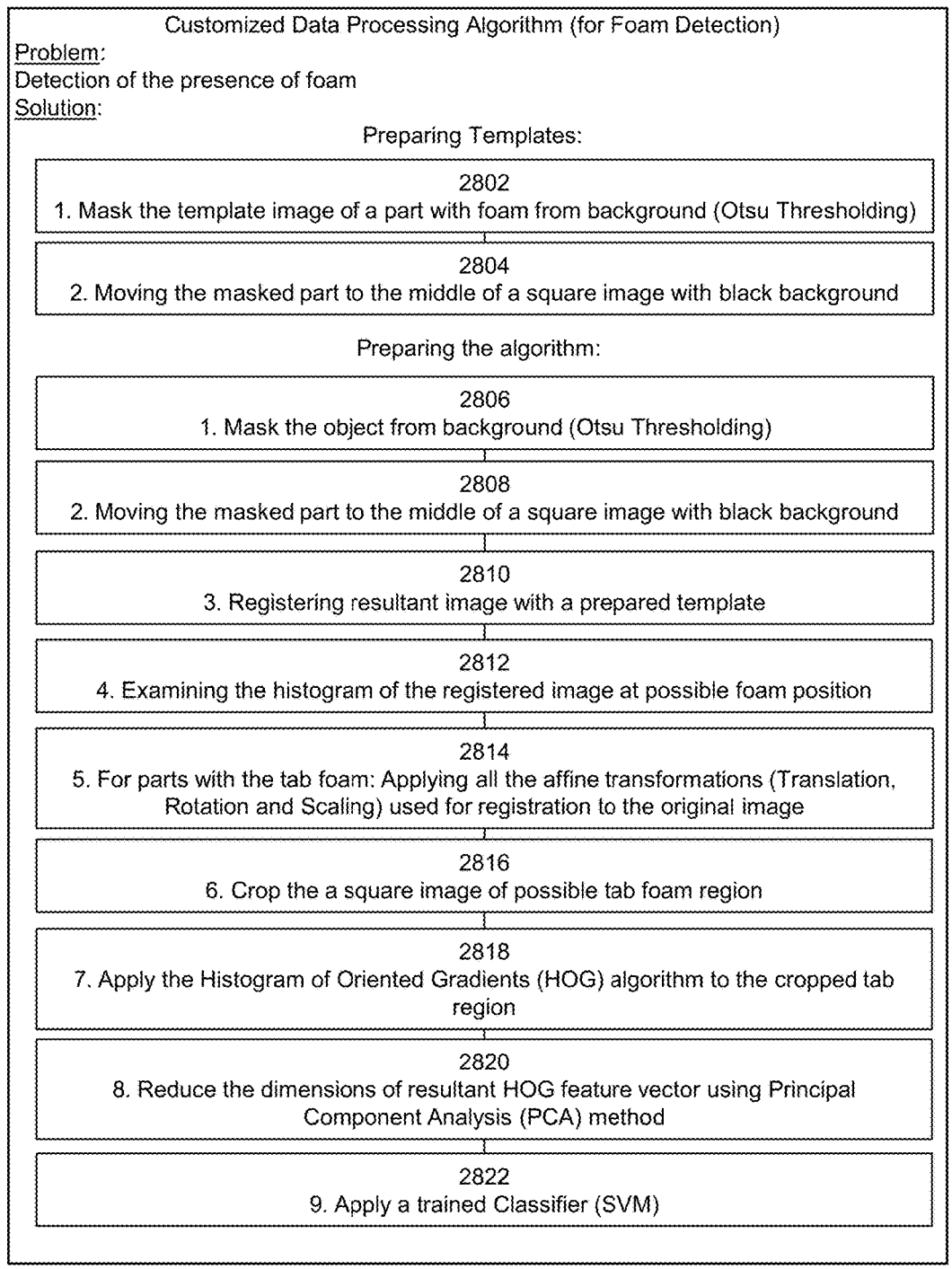
FIG. 28 shows an example data processing technique for detection of foam on a part, as described with reference to FIGS. 20 to 22.

Referring now to FIG. 28, shown therein is an exemplary data processing technique for use in an example implementation for detecting a subcomponent of a part, such as for detecting foam as described with reference to FIGS. 20 to 22. At blocks 2802 to 2804, template images of a part may be prepared. At block 2802 a template image of a part may be masked from the background. At block 2804 the masked part may be moved to the middle of a square image with a black background. At blocks 2806 to 2822 the technique can be used to prepare images of a part for use in image classification. At block 2806 an image of a part can be masked from the background. At block 2808 the masked part can be moved to the middle of a square image with a black background. At block 2810 the resultant image can be registered with a prepared template. At block 2812 a histogram of the registered image can be examined at a possible foam location. At block 2814, for parts with foam, affine transformations can be applied that were used for registration to the original image. At block 2816 the square image can be cropped to a possible foam region. At block 2818, histogram oriented gradients techniques can be applied to the cropped region. At block 2820, the dimensions of the resultant histogram oriented gradients vector can be reduced using PCA. At block 2822, a trained classifier (such as an SVM classifier) can be applied.

Referring now to FIGS. 29 to 35, shown therein are illustrative user interface screens and wireframe block diagrams illustrating how operators of the systems described herein can carry out the functionality of those systems.

Figure 29:
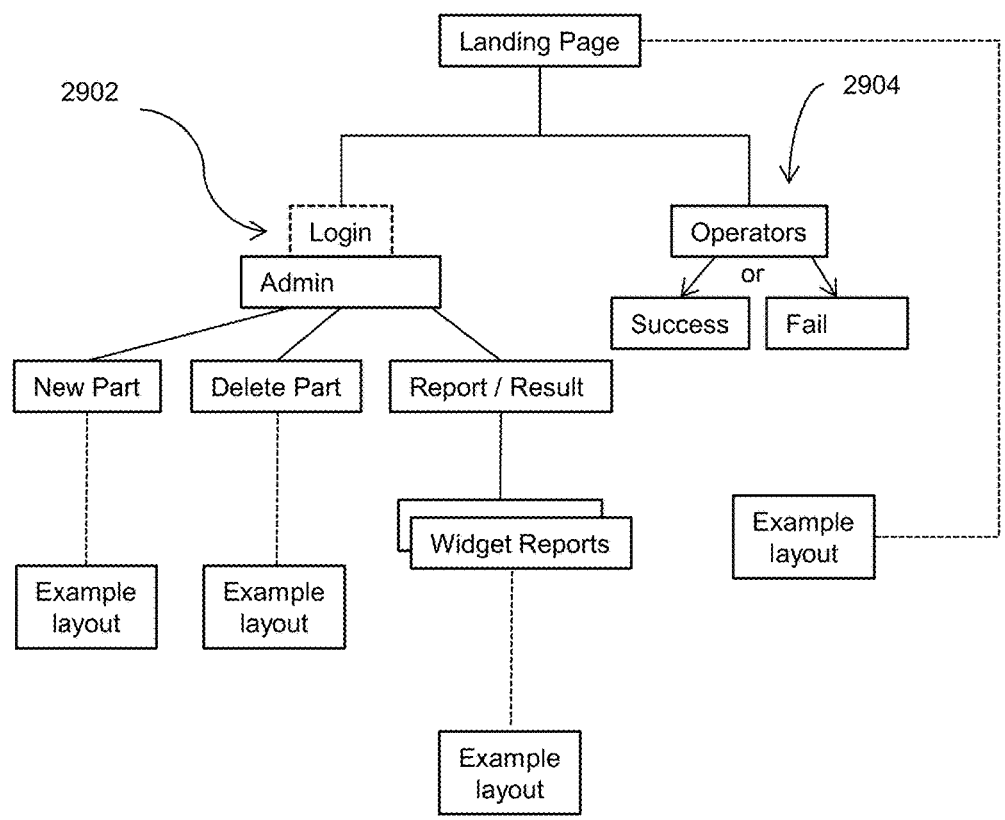
FIG. 29 shows an exemplary block diagram of a user interface for an operator of system for monitoring manufacturing quality.

FIG. 29 provides an exemplary wireframe block diagram of a user interface for an operator of system for monitoring manufacturing quality, comprising blocks 2902 to login and modify parts (e.g. add/delete parts) that can be analyzed by the engine, as well as blocks 2904 for operators to access to monitor parts quality during production.

Figure 30:
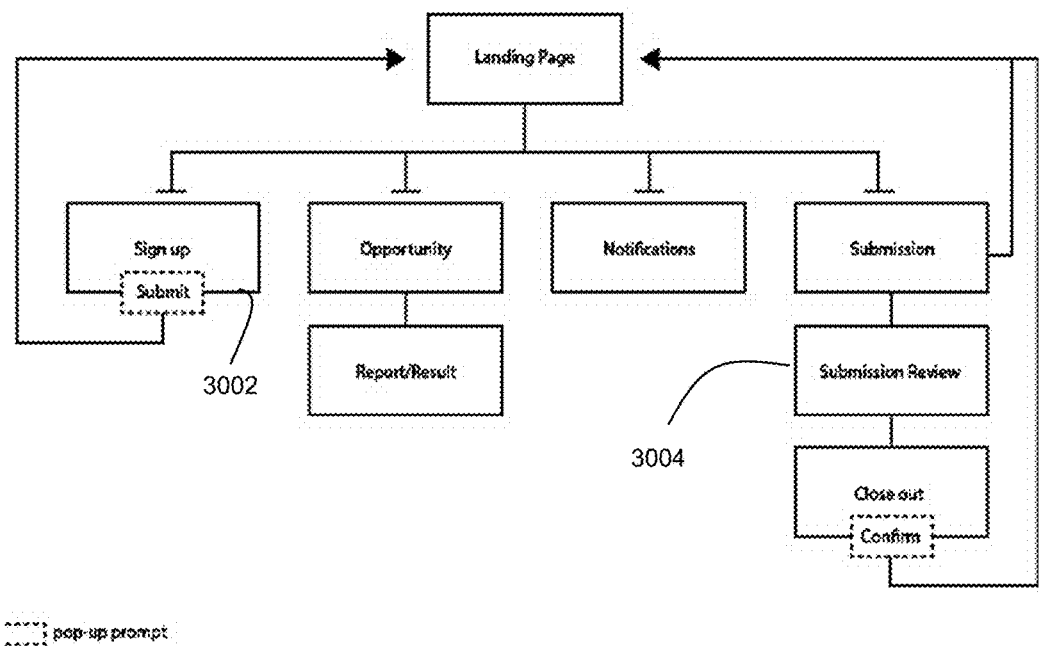
FIG. 30 shows a block diagram of a user interface for a groundtruther to provide submissions to an engine to review classification results.

FIG. 30 provides a wireframe block diagram of a user interface of a mobile application for ground truthing. According to a contemplated embodiment, a mobile application may be provided to facilitate ground truthing by providing submissions to an engine to review classification results. The mobile application may be communicatively linked to an IAAS platform comprising an engine and associated databases and classification model results. As described above, ground truthing may be implemented to ensure classification result accuracy according to an active learning technique. Specifically results from classification models may be rated with a confidence score, and high uncertainty classification results can be pushed to a ground truther to verify classification accuracy. A threshold on confidence level can automatically trigger a job to ground-truth. Optionally, classification outputs can periodically be provided to ground truthers to ensure accuracy. If a classification output is to be sent to a ground truther, a given input and current classification labeling can be entered into a job queue and provided to a ground truther for review. Further, results of submissions from ground truthers may be sent to the engine to dynamically modify the configuration of a particular classification model. The mobile application may provide a sign up 3002 feature so that individuals can provide ground truthing for classification models. A possible ground truther may sign up to the application and provide some description about their expertise, availability, interests, geographic location. The ground truther may subscribe to different types of tasks. Upon receipt of a submission from a groundtruther, an operator of the classification model could be alerted automatically that a review should begin. The operator could review the submission and update any relevant client databases based on the new information.

Figure 31:
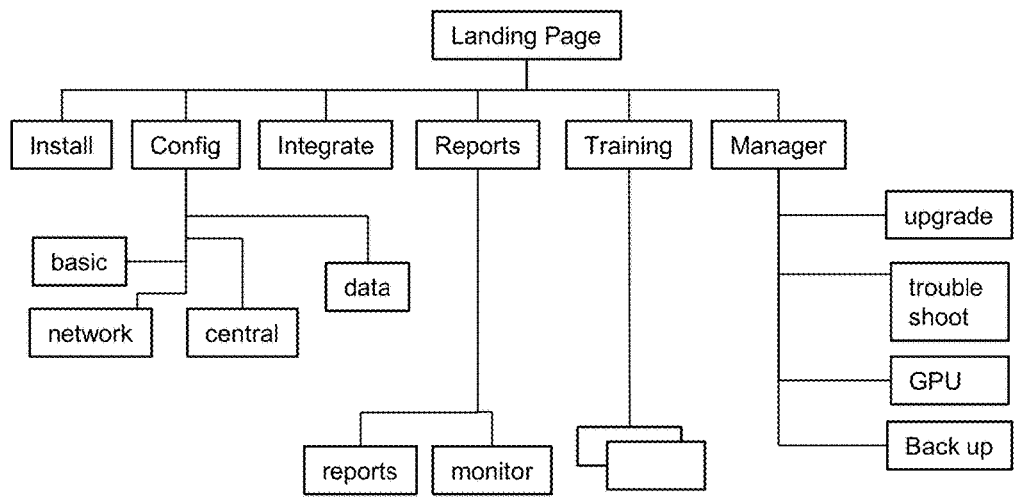
FIG. 31 shows a block diagram of various services provided by an engine, which may be accessible to different users.

FIG. 31 provides a wireframe block diagram of various services provided by an engine, which may be accessible to different users. For example, an administrator may have access to configuration services.

Figure 32:
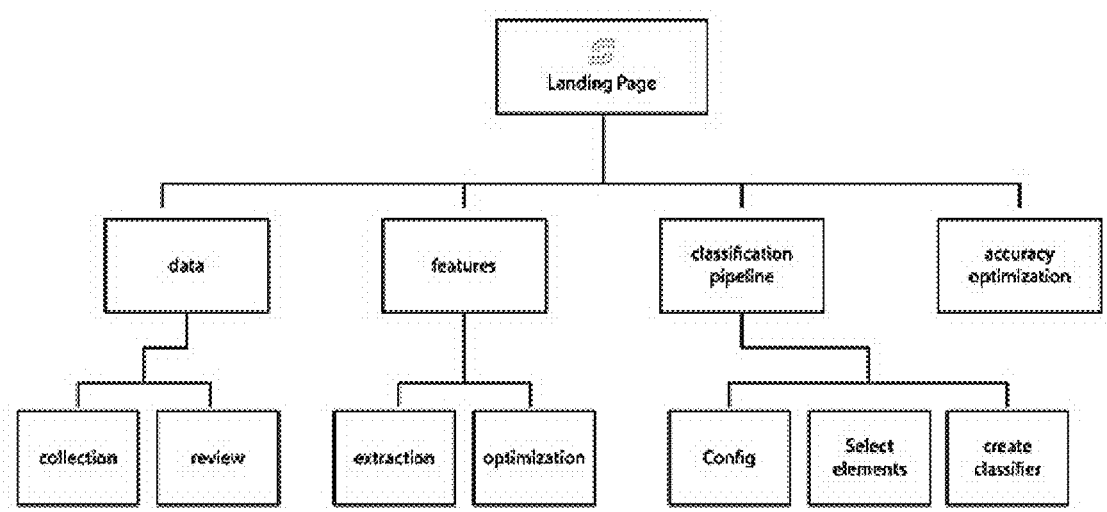
FIG. 32 shows a block diagram of a user interface for use by an engine operator to generate and manage a classification model.

FIG. 32 provides a wireframe block diagram of a user interface for use by an engine operator to generate and manage a classification model.

FIG. 33 provides an exemplary user interface landing page for logging into the engine.

Figure 34:
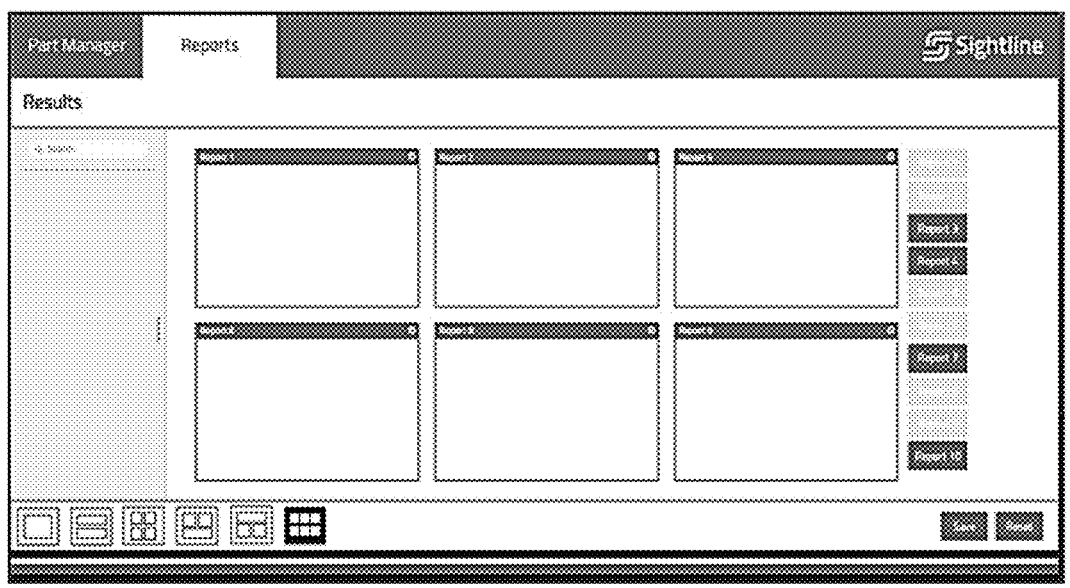
FIG. 34 shows an example user interface page of reports available on the engine as part of reporting services.

FIG. 34 provides an exemplary user interface page of reports available on the engine as part of reporting services.

Figure 35:
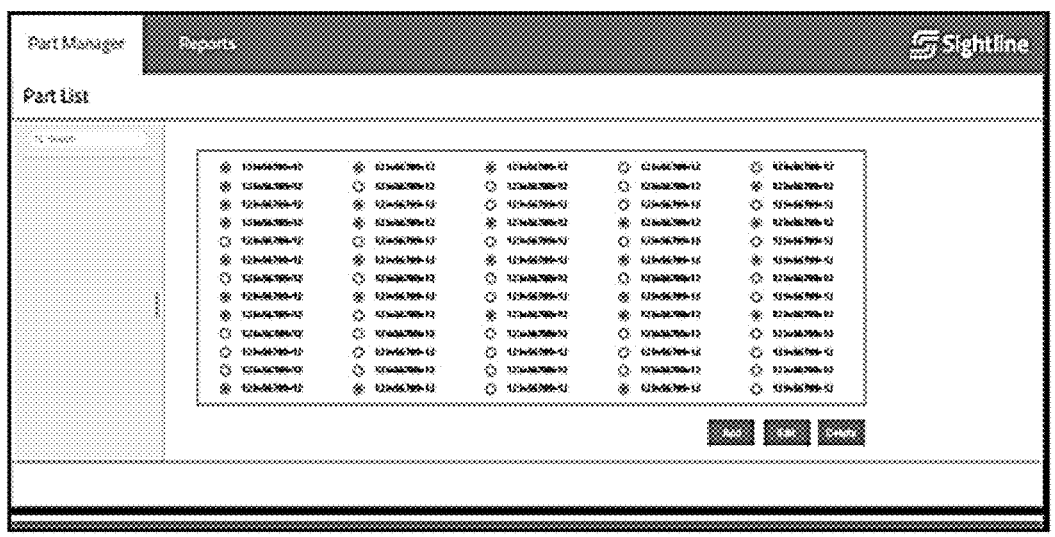
FIG. 35 shows an exemplary user interface page of a parts manager page.

FIG. 35 provides an exemplary user interface page of a parts manager page.

Various implementations are contemplated for embodiments of the systems and methods. Some example implementations will be described below. The listed implementations are merely illustrative and are not limiting. Further implementations would be contemplated by those of skill in the art.

Various implementations for monitoring manufacturing quality are contemplated, as described with reference to FIG. 14(a). Surface Inspection implementations of two and three-dimensional objects are contemplated, optionally over time, such as for automotive glass inspection. For example, exterior/interior surface inspection of a vehicle for variable and random defects in paint could be carried out. Coating and painting inspection implementations are further contemplated. With regards to medical coatings, inspection may be required at the two microns level. Implementations of optical interference patterns to detect surface defects are contemplated, such as to provide inspection of contact lenses to detect surface defects, such as holes. Braid inspection implementations are contemplated, such as for inspecting braided hoses in lengths of up to 1 mile which may require inspection for missing braid strands or braid strand sub components at up to 1 ft/sec. In addition a braid may need to be inspected for variance to the angle of the braid relative to a hose. Microscopic inspection of defects to identify a type of contamination for root cause analysis is contemplated, such as for manufacturing forensics. Motor stator wire winding pattern inspection implementations are contemplated to detect random bunching or contamination that could lead to premature failure. Image processing for some mobile sensor networks, such as for unmanned aerial vehicles (UAV) is contemplated, such as by using a deep convolutional network providing real time classification and using on board processing via FPGA for computation. Compressed sensing may be provided to make downlink of data possible, and to use distributed computation.

With respect to implementations relating to the detection of contamination in food manufacturing, as illustrated in FIG. 14(a), in order to provide a uniform product to consumers, industrial food production requires a method to ensure ingredients are consistently mixed. By combining inputs of multiple sensors (force, elasticity, density, opacity/translucency, pressure, temperature, flow, proximity, displacement, moisture, hyperspectral imaging, 3D scanning, X-ray, spectroscopy, Timers, Ultrasound, Camera, and Hyperspectral), embodiments of the engine could inform an operator that the mixture contains the correct amount of each ingredient and that the ingredients been completely mixed. Further, processed food suppliers have regulatory requirements to inspect products for various contaminations before and during production. This is typically done as batch testing by humans of raw materials and finished goods, however this methodology allows for the potential of some contamination reaching the consumer. By scanning ingredients at the raw material and production stages with hyperspectral sensors, the engine could be implemented to detect contaminants such as bone, bacteria, and hair that would otherwise go undetected. Additionally data can be stored and used for audit purposes to isolate sources of contamination.

Referring again to FIG. 14(c), implementations for inspection for security and surveillance are also contemplated. Inspection for contamination, pathogens, or quality deviation in food manufacturing are contemplated, using embodiments of the engine, and optical imaging, X-ray imaging, Terahertz imaging, millimetre wave imaging, spectrographic imagers or sensors, interferometric imagers or sensors, electronic nose, and/or other sensors. Further, inspection for contamination, pathogens, or quality deviation in pharmaceutical manufacturing are contemplated, using embodiments of the engine, and optical imaging, X-ray imaging, Terahertz imaging, millimeter wave imaging, spectrographic imagers or sensors, interferometric imagers or sensors, electronic nose, and/or other sensors. Further, inspection for contamination, pathogens, or contraband at the border or for airport luggage inspection are contemplated, including for food, plants, fungal contamination, etc., and other items prohibited, using embodiments of the engine, and optical imaging, X-ray imaging, terahertz imaging, millimetre wave imaging, spectrographic imagers or sensors, interferometric imagers or sensors, electronic nose, and/or other sensors. Further, augmentation of current airport and border screening processes, leveraging collaborative machine learning, active machine learning, and realtime training data set creation by processing of human operator actions are contemplated, using embodiments of the engine, and optical imaging, X-ray imaging, terahertz imaging, millimetre wave imaging, spectrographic imagers or sensors, interferometric imagers or sensors, electronic nose, and/or other sensors are contemplated. It is contemplated that an alert module could activated as a result of the output from an engine applied for security and surveillance. For example, if a pathogen is detected, a local security or medical professional could be notified.

Referring again to FIG. 14B, various medical diagnostics/analysis implementations are contemplated. Detection of pathogens (but not merely of pathogens) may be carried out by receiving detection signals from peripherals/associated sensors ("detectors") which may take any form that is suitable for the detection of a desired substance from a sample, or for detection of other relevant features. Typically, a sample may contain concentrations of a substance to be detected. The desired substance to be detected can be pathogens to be detected or indicators of the presence of the pathogens to be detected. Imaging modalities and appropriate sensors will be selected for detecting the presence of the pathogen or indicators of the presence of the pathogen. In particular embodiments, computation modules, such as neural networks are provided with input signals from sensors. The computational modules may be trained to classify the input signals, such as by indicating whether input signals relate to reference signals indicating the presence or absence of a substance.

A detector could be a molecular sensing array designed to be sensitive to one or more desired substances. Further, the detector could perform Surface-Enhanced Raman Spectroscopy (SERS), Surface Plasmon Resonance (SPR), Surface Plasmon Resonance Imaging (SPRi), Localised Surface Plasmon Resonance (LSPR), Optofluidic Nanoplasmonic, Optical waveguide-based sensing, Optical ring resonator-based sensing, Photonic crystal-based sensing, Nanosensitive OCT sensing, Lensless digital holographic imaging, Superresolution microscopy techniques, piezoelectric sensing, nano-cantilever sensing, Raman spectroscopy (RS), Resonance Raman spectroscopy (RRS), and infrared spectroscopy (IRS). In variations, the detector could perform interferometer-based detection, such as by using a Mach-Zehnder Interferometer, Young's interferometer, Hartman interferometer, Interferometric scattering microscopy (iSCAT), Single Particle Interferometric Reflectance Imaging (SPIRIS) and backscattering interferometry. Other detectors based on other detection techniques will now occur to a person of skill and are contemplated.

Aside from imaging sensors, other inputs relating to a patient may be provided for medical diagnostics implementations including temperature sensing, blood pressure, heart rate, patient medical history (as illustrated in block 1412), height, weight, demographic information etc.

According to a first embodiment, a neural network interprets received detection signals from a detector. The selected neural network may be configured as a convolutional feedforward neural network. Optionally, the neural network may receive at least one detection signal as an input and output an indication of whether a particular detection signal relates to a reference signal indicating the presence of a bound desired substance, or a reference signal indicating that a desired substance has not bound the sensing surface, as described above. Accordingly, during use at least a measured detection signal, or some scaled or otherwise modified value thereof, will be provided to the neural network as an input. Optionally, additional data may be provided to the input layer of the neural network to assist in interpreting received detection signals from a detector. Combinations of data could be provided at the input layer, including: protein interaction data (e.g. of the pathogen), and genomic/nucleic acid data of the pathogen, subject and/or desired substance (i.e. biomarker). Accordingly, high-throughput genomic sequencing of the subject/pathogen may be required, but could be performed by remote computers 160 and need not be carried out at the local device 140. Further input data could include mass spectrometry data (e.g. from pathogen protein sequencing). This embodiment may thus cross-correlate various inputs to provide an output to aid in interpreting a detection signal to determine whether a pathogen has been detected.

An output indicative of detection of a pathogen may result in notification being generated to alert a local medical professional; alert a medical professional already associated with the patient; alert an expert in the healthcare field with special knowledge of the specimen; and, alerting local health or police authorities as required by law for diagnosis of health conditions. Further, an output indicative of detection of a pathogen may result in generating a request for human ground-truthing of the detection signal/sample. For example, a microscopic image of a sample can be electronically transmitted to ground truther for assessment. Further, the patient may be advised of any immediate actions that they should take for their own immediate health and safety and for the public in the vicinity.

In another embodiment, a neural network is applied to compensate for nanoscale and quantum realm detection limitations. This is super-resolution or sub-pixel imaging or compressed sensing photography or sub-wavelength imaging. Particularly, a detection signal is provided to a neural network, with a desired output compensating for defects in the detection signal that may be caused by limitations of imaging in the nano-realm. The input layer may receive data relating to the detection modality and an input detection signal for detection of viruses, bacteria, fungi, parasites, human host (i.e. subject) cells, disease biomarkers, etc. The neural network may be trained such that the output layer provides a clean detection signal compensating for signal defects. Particularly, the neural network may be trained with a training dataset comprising, at the input layer, detection signals comprising nano-realm defects, and with associated clean detection signals at the output layer for viruses, bacteria, fungi, parasites, human host cells, disease biomarkers for detection modalities. The output of the trained neural network may provide a processed detection signal similar to known reference signals for particular detection modalities such that processing by the neural network remedies some defects and limitations of received detection signals.

In another embodiment, a neural network is applied to drive evolution of the choice of reaction substances provided for pathogen detection with a sample. Particularly, selection of a reaction substance may compensate for mutation, pleomorphism and polymorphism of pathogens to ensure that appropriate reaction substances are selected to maximize likelihood of detecting a pathogen. Accordingly, inputs including a combination of time series genomic data of the pathogen and/or human host cells, and data relating to a plurality of desired substances (e.g. disease biomarkers) may be provided to a neural network trained to provide an output indicating which reaction substance(s) should be selected. A sensing surface comprising, for example, a selected biosensor immunoassay antigen capture mechanism could then be provided to each reaction chamber of a collection unit. The embodiment may similarly require high-throughput genomic sequencing of the subject/pathogen, as well as mass spectroscopy data.

In another embodiment, a neural network based predictive output machine is provided. Particularly, the machine learning predictive output machine may receive inputs comprising time series genomic data of a subject in order to provide an output indicative of a clinical outcome. To provide time series inputs, samples may be taken and sequenced from a subject and/or pathogen over a period of time to maintain or improve the accuracy of the neural network over time. To train the neural network a training dataset may comprise known inputs of the specified data types as well known associated clinical outcomes. Further data inputs may include, time series genomic data of various pathogens and protein interaction in the pathogen and host, subject history (e.g. flight history or medical history), subject condition (e.g. resistivity to aids).

In view of the above implementations for medical diagnostics/analysis, a method is contemplated wherein: foreground/background scene parsing, foreground and background separation in image and non-image processing techniques for a classification model that is extended to genomic analysis, proteomic analysis, protein-protein interaction, through the use of machine learning techniques including deep neural networks; the genomics ("ACGT") string mapping problem is translated to a format which is suitable for solution by deep nets, which may include a mapping such as closed polygon to partial string techniques; a generative model for genetic coding anomalies is constructed, and outputs of generative models are compared in an optimized manner to sample data using hashes at the sensor location (Bloom filters).

Implementations for precision medicine are contemplated. Precision medicine is an emerging approach for disease treatment and prevention that takes into account individual variability in genes, environment, and lifestyle for each person. With inputs from sensors, embodiments of the engine may be implemented to analyze variation in human genomic data, genomic expression, proteomic data, protein expression, phenotypic data, symptoms, and external data inputs including environmental factors, diet, symptoms, demographic information, exercise, etc. Based on the data collected, tracked and provided to the engine, analyzed data may help provide information to tailor a treatment approach for a patient.

Implementations for analyzing pathogen variation are contemplated. In embodiments, the engine can analyze variation in pathogen (including virus, bacteria, parasite, fungus, viroid, prion) genomic data, genomic expression, proteomic data, protein expression, phenotypic data, symptoms, and external human and/or animal data inputs including environmental factors, diet, symptoms, demographic information, exercise, etc. to identify, track and or help treat pathogenic infections. Based on the data collected, tracked and provided to the engine, analyzed data will help provide information to identify a pathogen, classify a new pathogen and or recommend treatment approaches. A particular implementation of a method for analyzing pathogen variation may comprise polling scientific literature to assess pathogen variation. Particularly, the method may comprise selecting a relevant set of scientific journals that will be sufficient to update a database with respect to a specific pathogen, its evolution, its relation to drug efficacy, and population cohorts that are especially susceptible. The engine may download new content and run a text mining technique on the data to note references to the pathogen. Text association rules may be applied. A summary of inferences may be provided for review by an appropriate operator of the engine. Upon approval by the human operator, the content may be added to a curated database. An audit trail may be maintained about the content used to make the decision, who made the decision to include the new content.

Implementations for drug discovery are contemplated. Drug discovery is the process by which new candidate medications are discovered, often through the screening of a library of molecules or compounds in the thousands. Coupling and measuring drug candidate profiles against known and unknown disease markers helps identify either compounds with similar efficacy profiles or new drug targets. Based on the data collected, tracked and provided to the engine, analyzed data will help provide information to identify suitable drug candidates in a drug library or help identify a target(s) that are associated with a particular disease state.

Implementations to discover potential uses for drugs are contemplated. Often drugs, once approved for clinical use, are limited in terms of the indications (uses) given to them by geographic regulatory bodies. To help determine whether a candidate drug has other potential uses, thereby broadening its indication uses, a drug's usefulness and commercial lifespan can be expanded thereby increasing its commercial and therapeutic value. Based on the drug data collected, tracked and provided to the engine, analyzed data will help provide information to identify other suitable drug targets and therapeutic uses by identifying comparative mechanisms of actions against other existing drugs, and or identifying new target genes and mechanisms of action.

Implementations to assess drug efficacy are contemplated. Drug efficacy must be proven to regulatory bodies in order to achieve market approval. In addition, the stronger the results, the higher the drug's value and potential price point. Assessing drug efficacy is a time-consuming process of drug and clinical study analysis. Based on the drug data collected, tracked and provided to the engine, analyzed data will help provide information to identify other suitable drug targets and therapeutic uses by identifying comparative mechanisms of actions against other existing drugs, and or identifying new target genes and mechanisms of action.

Further, it is contemplated that the engine can be used to analyze variation in a patient's endogenous biomarker and cellular profile and as such detect and monitor various disease states over time, before, during and after treatment for various medical conditions, including Infectious Diseases, Rheumatological Disease, Cardiovascular Disease, Respiratory Disease, Endocrine Disease, Neurological Disease, Nephrological Disease, Urological Disease, Gynecological Disease, Obstetrical Disease, Hematological Disease, Gastroenterological Disease and for Oncology. The engine can be used to analyze a patient's genomic data, genomic expression, proteomic data, protein expression, phenotypic data, metabolomic profile, tissue biopsies, signs & symptoms, and external human and/or animal data inputs including environmental factors, diet, symptoms, demographic information, exercise, etc. Based on the data collected, tracked and provided to the engine, analysis will help provide information to identify risk factors, pathophysiology, appropriate management and prognosis of disease via the monitoring of disease states before, during and following therapeutic intervention.

Further, the engine can be implemented to analyze and interpret normal vs. abnormal patient images collected and/or seen through various imaging and microscopy modalities including but not limited to: Radiography, CT, MRI, PET, Ultrasound, Dermatoscopy, Colonoscopy, Endoscopy, Cystoscopy, Colposcopy, Mammography, Confocal, electron, digital holographic microscopy.

By way of brief review of some of the embodiments described above, the systems and methods described herein thus provide a nested FSM structure or other data structure (i.e. a workflow), including a structure expressed as an interconnection of directed graph structures, where such directed graph structures may be recursive and therefore nested, and where state transitions can be driven by mathematical or logic evaluation, which may or may not result in static or dynamic structural adjustment based on any of: an internal state evaluation, including a nested FSM evaluation that involves a reflective or child calculation, IO connectivity to any hardware device, and/or realtime feedback of system or resource state from components in the system. The structures may be used to represent internal object state attributes or fields, or initialize values of said targets. The structures may be represented via a markup language, an in-memory data structure, or a database or other serialization of said structure. The structures may be used to implement a metadata configuration system which may perform dynamic runtime provisioning, bootstrapping, instantiation, and configuration of system components, including to perform automatic UI generation potentially with a statically or dynamically defined overlay on an automatically generated UI, and to perform element debugging, storing, tracing, and testing.

A system is provided which provides metadata driven bootstrapping of computation and/or storage nodes, a metadata driven cloud orchestration controller which may dynamically adjust a configuration, and a metadata driven dynamic UI generation which may be adjusted via calculations of the system.

A system is also provided that coordinates, enables, or is enabled by the definition of a stream or message processing pipeline where, said pipeline which may be distributed across compute nodes connected by TCP/IP, DMA, PCI, USB, Bluetooth or similar connectivity.

Message based communications of components of the systems may be streamed between the configured nodes for networked distribution to accelerate operations that may or may not leverage systems based on FPGA, ASIC, GPU, Embedded/SoC.

Further message based communications may be streamed between nodes for static, or dynamic configuration or reconfiguration of a networked distribution which may: improve system performance or accuracy via active learning (e.g. ground truthing), and dynamic reconfiguration of capture modes, training modes, and normal modes of classification, segmentation, and regression; optimize a system configuration by statically or dynamically adjusting node bootup, shutdown, or interconnection based on node availability, computing resource availability on nodes (including FPGA, GPU, and CPU state), system fault or network conditions;

and enables coordinated static or dynamic deployment of runtime components by leveraging server, desktop, mobile, and or SoC/embedded platforms, and direct physical or networked access to sensors.

Access to sensors may provide detection of or a derivative computation from electromagnetic sensing spanning the spectrum (e.g. sub-optical (high energy), IR, microwave, RF) which may involve imagery analysis, interferometric analysis, chemical composition analysis based, detectable by input from EM detection (such as sensors having sensing modes including optical, spectroscopy, NEMS, MEMS and electronic noise). Sensors include but are not limited to any combination of the following: optical, biometrics, X-ray, MEMS, NEMS, interferometry that is based on NEMS or MEMS sensor systems including microfluidics (e.g., saliva analysis), LoC, SoC, mass spectrometry, next-generation sequencing methods [genome sequencing, genome resequencing, transcriptome profiling (RNA-Seq), DNA-protein interactions (ChIP-sequencing), and epigenome characterization, massively parallel signature sequencing (or MPSS), polony sequencing, pyrosequencing, Illumina dye sequencing, SOLiD sequencing (sequencing by ligation), Ion semiconductor sequencing, DNA nanoball sequencing, Heliscope single molecule sequencing, single molecule real time (SMRT) sequencing, nanopore DNA sequencing, tunneling currents DNA sequencing, sequencing by hybridization, sequencing with mass spectrometry (Matrix-assisted laser desorption ionization time-of-flight mass spectrometry, or MALDI-TOF MSa), microfluidic Sanger sequencing, RNAP sequencing, In vitro virus high-throughput sequencing]; Radiological: CT, MRI, X-ray, PET, endoscopy, bronchoscopy; tissue biopsy, dermatoscopy, microscopy, fundoscopy, colposcopy, cystoscopy, optical coherence tomography.

Imaging and image capture may comprise video recorders and cameras, lighting equipment, thermal imagers, X-ray.

A tracing system is provided that intercepts stream or messaging connections between components that may be integrated in a fashion that obfuscates or abstracts network distribution; that may record and playback of internode communication for the purposes of simulation, development activity or operations testing and/or deployment, and debugging and/or monitoring; that may have integration with developer operations, testing, and monitoring processes or operations; and may integrate with any of the above systems to create a feedback loop that affects any aspect of system performance via links that are statically coded, or driven by further metadata definition and/or any system calculation.

The system may further be implemented for real time and dynamic output to augment or replace human inspection and quality control operations applicable to manufacturing verification in auto, aviation, food, and pharmaceutical inspections, and for travel and border transit auditing and verification including border or airport screening for contraband or agricultural restricted material, including but not limited to fungal contamination. Systems can be used to analyze a stationary or moving target, optionally providing analysis while a stationary or moving target is exposed to materials in motion, and may normalize imagery input in realtime.

The systems may further be implemented to attempt to accomplish objectives including: compensation for differences between processing pipeline requirements for imagery spanning a micro or nano resolution cell size; realtime control of sample collection and preparation of a mechatronic or robotics based system; and evolution of material specification or production of any functionalized materials on a micro or nano surface.

The systems may further be used for pathogen detection, prediction of medical diagnostic outcomes where the system may integrate with paper or electronic collections of patient information, driving background and foreground separation of genetic material for a required analysis. The systems may be used for applying imagery segmentation techniques to genetic data, and for using feature definition and extraction based on computer vision derived methods. The systems may drive static or dynamically improving correlations/predictions between protein markers, genetic information, and biological outcomes, and may be used in applications that augments or replaces protein interaction analysis with genetic analysis.

The systems may further be used for antimicrobial resistance ("AMR"), drug testing, animal testing, food safety testing, predicting biological outcomes for drug resistance, drug or vaccine effectiveness and pathogen evolution.

When the system is used for AMR, an exemplary system is one: where sensors are used with a patient data collection system with a classification system; where the classification system is augmented with a database; where the database contains information on class (classification) labels associated with data samples; where the database is updated periodically with new information content and/or corrections to previous content; where the database is derived from a collection of information that includes journal publications that have been text mined; where a "doctor in the loop" workflow model is implemented and all automated text mined results are presented to a medical healthcare professional for approval to update the database with the mined content; where all content updates trigger a retrospective review to determine which patient treatment programs are affected; where the database has a list of patients and their primary care providers (PCP); where a notification service is provided such that when a patient's healthcare program is impacted by new data updates; where all "doctor in the loop" activities are logged in a manner suitable for auditing; where the database contains information about antimicrobial resistance; where the database additionally contains information about patient susceptibility to different diseases/pathogens; where the database additionally contains information on which treatments are likely to be most effective for the diagnosed pathogen given information relative to treatment efficacy on a patient cohort that is similar to the patient from which the data sample was obtained; where the patient similarity to the patient cohort includes genetic similarity; where the data samples contain information about pathogen exposure and/or presence; where the data samples contain other health-related information; where the data samples collected can be processed to determine a patient's healthcare profile and likelihood that a certain treatment program is optimal with respect to health outcomes; where a peer to peer network exists that includes health research organizations and point of care (POC) locations; where the POC stations are field stations in pathogen outbreak regions; where data is anonymized and aggregated, data processed and health alerts are issued to human mass transit control points; where real-time alerts are issued for limiting the spread of persons with highly contagious diseases; where the real-time aspect of the alert is facilitated by a resource orchestration agent such that clinical decision support is enabled with ad hoc, heterogeneous networks of compute resources; where the alert is for an individual or a disease susceptible group of persons; where the diagnosis is considered individualized due to the analysis of genomics information derived from patient samples; where the data transfer and alert notification conform to health regulations such as privacy; where the analysis system may consists of a deep net; where use of the described system with data which has associated metadata in the form of a jurisdictional certificate; where the jurisdictional certificate is used to determine access to and use of the data element by downstream compute nodes or associations of end users, whether use or access it at the sample level or a higher aggregate granularity level; where the jurisdictional certificate is associated with a micro-payment mechanism; where the jurisdictional certificate can be authenticated by independent third parties in point of care or point of service (POS) distributed locations e.g. airports; where the jurisdictional certificate is combined with the encryption technique to allow only authorized use of the associated data; where the jurisdictional certificate is associated with a notification list for various organizations. e.g. airport alert about a local pathogen outbreak; where the jurisdictional certificate is associated with various combinations of research, academic, governmental, non-governmental and/or corporate organizations; where the jurisdictional certificate is associated with specified geographic areas or political boundaries; where the jurisdictional certificate is associated with different disease/pathogens and health care policies; where the jurisdictional certificate is authenticated at mass transit locations such as an airport, shipyard or train station; where the jurisdictional certificate allows for negotiated access and use of the data element (or aggregated data values) based on a pre-defined negotiation strategy/cost per data formula.

The above systems and implementations may be provided with hardware acceleration via embedded systems or SoC, FPGA, ASIC, GPU acceleration, other hardware systems.

The systems may provide improved accuracy of the described functions via active learning, ground truthing, and dynamic reconfiguration of capture, train, and normal mode of classification, segmentation, and regression dynamic reconfiguration of capture, train, and normal mode of classification, segmentation, and regression The above-described implementations are intended to be examples and alterations and modifications may be effected thereto, by those of skill in the art, without departing from the scope which is defined solely by the claims appended hereto. For example, methods, systems and embodiments discussed can be varied and combined, in full or in part.

We claim:

1. A system for applying a deep learning neural network to data obtained from one or more sensors on a client computing system, the one or more sensors sensing components of an industrial scene, the system comprising:
a network accessible server system linked to the client computing system, the server system configured to provision and send an application to be executable on the client computing system, the application allocating computing tasks to the server system, the server system provisioning the application based on a schema definition comprising metadata received from the client computing system such that the application is customized for the client computing system and causes interaction with the sensors particular to the client computing system; and
one or more peripheral devices, at least one of the peripheral devices comprising one or more of the sensors, each peripheral device associated with the scene, each peripheral device connected to the client computing system, the client computing system transmitting the sensor data to the server system, the server system building a one or more trained classification models to extract one or more features using the sensor data sensed by the sensors connected to the client computing system, the one or more classification models applying a neural network based scene parsing and scene matching to a portion of the sensor data transmitted from the client computing system to parse and match the one or more extracted features as feature vectors, training of the one or more classification models considering only sensor data from the one or more sensors connected to the client computing system, the client computing system parsing and matching one or more features from other portions of the sensor data transmitted from the client computing system based on feature vectors computed using the one or more trained classification models received from the server system, the matching using previously known components, the client computing system controlling positioning, motion, or obtainment of sensor information of at least one of the peripheral devices based on the output of the matching from the one or more trained classification models.

2. The system of claim 1, wherein the sensors comprise image capture devices.

3. The system of claim 1, wherein the sensor data is transmitted by the client computing system to the server system through interfaces that provide anonymization, encryption, compression and jurisdictional stamping.

4. The system of claim 1, wherein the sensor data comprises a plurality of data points aggregated from a plurality of sensors.

5. The system of claim 1, wherein results of the classification process are transmitted to a ground truther to evaluate model accuracy to implement an active learning process.

6. The system of claim 5, wherein the system further provides a confidence score to the ground truther.

7. The system of claim 1, wherein the server system applies a plurality of neural networks simultaneously and provides a list of classifiers.

8. The system of claim 7, wherein the classifiers in the list are provided with confidence values.

9. A method of applying a deep learning neural network to data obtained from one or more peripheral devices connected to a client computing system, at least one of the peripherals devices comprising one or more sensors, the one or more sensors sensing components of an industrial scene, each peripheral device associated with the scene, the method comprising:
linking a network accessible server system to the client computing system;
configuring the server system to provision and send an application to be executable on the client computing system, the application allocating computing tasks to the server system, the server system provisioning the application based on a schema definition comprising metadata received from the client computing system such that the application is customized for the client computing system and causes interaction with the sensors particular to the client computing system;
receiving sensor data from the one or more peripheral devices connected to the client computing system at the server system;
building one or more trained classification models at the server system to extract one or more features using the sensor data sensed by the sensors, the one or more classification models applying a neural network based scene parsing and scene matching to a portion of the sensor data transmitted from the client computing system to parse and match the one or more extracted features as feature vectors, training of the one or more classification models considering only the sensor data from the one or more sensors connected to the client computing system;

transmitting the one or more trained classification models to the client computing system to be usable at the client computing system to parse and match one or more features from other portions of the sensor data based on feature vectors computed using the one or more trained classification models, the matching using previously known components; and outputting the matching from the one or more trained classification models to be used by the client computing system to control positioning, motion, or obtainment of sensor information of at least one of the peripheral devices based on the output of the matching.

10. The method of claim 9, wherein the sensors comprise image capture devices.

11. The method of claim 9, wherein the sensor data is transmitted by the client computing system to the server system through interfaces that provide anonymization, encryption, compression and jurisdictional stamping.

12. The method of claim 9, wherein the sensor data comprises a plurality of data points aggregated from a plurality of sensors.

13. The method of claim 9, wherein results of the classification process are transmitted to a ground truther to evaluate model accuracy to implement an active learning process.

14. The method of claim 13, further comprising providing a confidence score to the ground truther.

15. The method of claim 13, wherein the server system applies a plurality of neural networks simultaneously and provides a list of classifiers.

16. The method of claim 15, wherein the classifiers in the list are provided with confidence values.

* * * * *